US010548144B2

(12) United States Patent
Soriaga et al.

(10) Patent No.: US 10,548,144 B2
(45) Date of Patent: *Jan. 28, 2020

(54) INTERFERENCE AWARE RECIPROCAL CHANNEL SOUNDING REFERENCE SIGNAL

(71) Applicant: QUALCOMM Incorporated, San Diego, CA (US)

(72) Inventors: Joseph Binamira Soriaga, San Diego, CA (US); Jing Jiang, San Diego, CA (US); Krishna Kiran Mukkavilli, San Diego, CA (US); Naga Bhushan, San Diego, CA (US); Tingfang Ji, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/956,616

(22) Filed: Apr. 18, 2018

(65) Prior Publication Data
US 2018/0242330 A1    Aug. 23, 2018

Related U.S. Application Data

(63) Continuation of application No. 14/866,768, filed on Sep. 25, 2015, now Pat. No. 9,980,271.
(Continued)

(51) Int. Cl.
*H04W 16/28* (2009.01)
*H04W 72/08* (2009.01)
(Continued)

(52) U.S. Cl.
CPC ........ *H04W 72/082* (2013.01); *H04B 7/0421* (2013.01); *H04B 7/0602* (2013.01);
(Continued)

(58) Field of Classification Search
None
See application file for complete search history.

(56) References Cited

U.S. PATENT DOCUMENTS

| 8,145,248 B2 | 3/2012 | Han et al. |
| 8,463,191 B2 | 6/2013 | Farajidana et al. |

(Continued)

OTHER PUBLICATIONS

Mitsubishi Electric: "Exploiting Channel Reciprocity in TDD/MIMO with Asymmetric, Interference", 3GPP draft, R1 -091144, 3rd Generation Partnership Project (3GPP), Mar. 18, 2009, Mar. 18, 2009 (Mar. 18, 2009), pp. 1-6, XP050338768 (Year: 2009).*
(Continued)

*Primary Examiner* — Faruk Hamza
*Assistant Examiner* — Thinh D Tran
(74) *Attorney, Agent, or Firm* — Haynes and Boone, LLP

(57) ABSTRACT

Systems, devices, and methods associated with interference aware sounding reference signals are provided. A method for wireless communication includes receiving, at a wireless communication device in communication with a first base station, an interfering signal from a second base station (or other base stations); determining, at the wireless communication device, a spatial direction of the interfering signal; and transmitting, with the wireless communication device, a signal to the first base station based on the spatial direction of the interfering signal. Another method of wireless communication includes receiving, at a first base station, a signal from a wireless communication device, the signal based on a spatial direction of an interfering signal received by the wireless communication device from a second base station (or other base stations); transmitting, with the first base station, a downlink communication to the wireless communication device, the downlink communication beamformed in the spatial direction based on the signal received from the wireless communication device.

30 Claims, 15 Drawing Sheets

Related U.S. Application Data

(60) Provisional application No. 62/133,366, filed on Mar. 14, 2015.

(51) Int. Cl.
  *H04W 72/04* (2009.01)
  *H04B 7/06* (2006.01)
  *H04B 7/0417* (2017.01)

(52) U.S. Cl.
  CPC .......... *H04B 7/063* (2013.01); *H04B 7/0617* (2013.01); *H04B 7/0626* (2013.01); *H04B 7/0671* (2013.01); *H04W 16/28* (2013.01); *H04W 72/042* (2013.01); *H04W 72/0413* (2013.01)

(56) References Cited

U.S. PATENT DOCUMENTS

| | | | | |
|---|---|---|---|---|
| 9,467,998 | B2* | 10/2016 | Xiao | H04W 72/0426 |
| 2010/0285762 | A1* | 11/2010 | Ko | H04L 5/0023 |
| | | | | 455/127.1 |
| 2011/0002415 | A1* | 1/2011 | Nakao | H04B 7/0439 |
| | | | | 375/296 |
| 2012/0039273 | A1 | 2/2012 | Nam et al. | |
| 2014/0241242 | A1 | 8/2014 | Josiam et al. | |
| 2015/0009951 | A1* | 1/2015 | Josiam | H04L 25/0224 |
| | | | | 370/330 |
| 2015/0065153 | A1 | 3/2015 | Nissila et al. | |
| 2016/0212643 | A1* | 7/2016 | Park | H04B 7/0626 |
| 2016/0270087 | A1 | 9/2016 | Soriaga | |
| 2017/0099694 | A1* | 4/2017 | Qian | H04W 74/00 |

OTHER PUBLICATIONS

International Search Report and Written Opinion—PCT/US2016/016729—ISA/EPO—dated Jun. 27, 2016.

Lagen S., et al., "Decentralized Beamforming with Coordinated Sounding for Inter-Cell Interference Management," Proceedings of the 20th European Wireless Conference, 2014, pp. 1-6.

Mitsubishi Electric: "Discussion on Preceded SRS", 3GPP Draft, R1-092441, 3rd Generation Partnership Project (3GPP), Mobile Competence Centre, 650, Route Des Lucioles, F-06921 Sophia-Antipolis Cedex, France, No. Los Angeles, USA, Jun. 23, 2009, Jun. 23, 2009 (Jun. 23, 2009), pp. 1-6, XP050350953, [retrieved on Jun. 23, 2009] paragraphs [0002]. [3. 4)]. [5. 2)], figures 2,3.

Mitsubishi Electric: "Exploiting Channel Reciprocity in TDD/MIMO with Asymmetric, Interference", 3GPP draft, R1-091144, 3rd Generation Partnership Project (3GPP), Mobile Competence Centre, 650, Route Des Lucioles, F-06921 Sophia-Antipolis Cedex, France, No. Seoul, Korea, Mar. 18, 2009, Mar. 18, 2009 (Mar. 18, 2009), pp. 1-6, XP050338768, [retrieved on Mar. 18, 2009] paragraphs [02 .1], [02.2], figures 1,2.

\* cited by examiner

INTERFERENCE AWARE RECIPROCAL CHANNEL SOUNDING REFERENCE SIGNAL

CROSS REFERENCE TO RELATED APPLICATIONS

The present application is a continuation application of U.S. patent application Ser. No. 14/866,768, filed Sep. 25, 2015, which claims priority to and the benefit of the U.S. Provisional Patent Application No. 62/133,366, filed Mar. 14, 2015, each of which is hereby incorporated by reference in its entirety.

TECHNICAL FIELD

This application relates to wireless communication systems, and more particularly to improving communications between user equipment and a base station by accounting for the spatial direction of interference received by the user equipment.

BACKGROUND

A wireless communication network may include a number of base stations that can support communication for a number of user equipments (UEs). In recent years, the carrier frequencies at which base stations and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G, or 4G), however, more beam forming gain (and more accurate) is becoming necessary.

Further, conventional systems employ various types of reference signals, with varying fixed structures, to provide sufficient measurements and estimations for adaptive multi-antenna operation in uplink and/or downlink directions. For example, a channel state information reference signal (CSI-RS) may be used on a downlink from the base station to aid the base station in beam form determination, an uplink demodulation reference signal (DMRS) specific to each UE may be used to estimate channel information for the uplink specifically, and each UE may use a sounding reference signal (SRS) on the uplink to aid in scheduling (e.g., determining which frequency bands are good or bad for data). There is no single signal that is able to achieve all of above functionality for UEs.

Reciprocity describes the ability for a station to use information (such as a multipath delay profile) from one channel (e.g., the uplink) in making determinations regarding another channel (e.g., the downlink). Reciprocity has not been available for cellular networks because current approaches require reference signals specific for particular antennas, such as CSI-RS in the long term evolution (LTE) context. Further, CSI-RS and other types of signals do not scale well, which is becoming an ever-increasing issue as the demand for mobile broadband continues to increase.

In addition to intended communication received from the base station, user equipment can also receive interfering signals. These interfering signals can arise from a variety of sources. For example, the interference can be the result of established communication channel between another device and another base station. Communication between user equipment and base stations is hampered when intended downlink communication is received along with interference.

SUMMARY

In an aspect of the disclosure, a method for wireless communication is provided that includes receiving, at a wireless communication device in communication with a first base station, an interfering signal from a second base station (or other base stations); determining, at the wireless communication device, a spatial direction of the interfering signal; and transmitting, with the wireless communication device, a signal to the first base station based on the spatial direction of the interfering signal.

In another aspect of the disclosure, transmitting the signal to the first base station includes: transmitting a beamformed sounding reference signal (SRS) to the first base station. In another aspect, the beamformed SRS has a spatial direction that limits interference from the interfering signal. In another aspect, the beamformed SRS is established based on a beam codebook. In another aspect, the beamformed SRS is established based on a calculation associated with interference from the interfering signal. In another aspect, the method further includes receiving, at the first wireless communication device, a downlink communication from the base station, wherein downlink communication layer are beamformed in the spatial direction(s) based on the signal transmitted to the first base station. In another aspect, the transmitting the signal to the first base station includes: transmitting, with the wireless communication device, multiple signals to the first base station based on the spatial direction of the interfering signal. In another aspect, the multiple signals are transmitted simultaneously. In another aspect, the multiple signals each have a different phase. In another aspect, the multiple signals are transmitted sequentially over time. In another aspect, the multiple signals each have a different phase. In another aspect, the transmitting the multiple signals includes: transmitting at least one sounding reference signal (SRS) via a first antenna of the mobile communication device at a first time; and transmitting at least one SRS via a second antenna of the mobile communication device at a second time.

In another aspect of the disclosure, a method for wireless communication is provided that includes receiving, at a first base station, a signal from a wireless communication device, the signal based on a spatial direction of an interfering signal received by the wireless communication device from a second base station (or other base stations); transmitting, with the first base station, a downlink communication to the wireless communication device, wherein downlink communication layers are beamformed in the spatial direction(s) based on the signal received from the wireless communication device.

In another aspect of the disclosure, the receiving a signal from the wireless communication device includes: receiving a beamformed sounding reference signal (SRS). In another aspect, the beamformed SRS has a spatial direction that limits interference at the wireless communication device from the interfering signal. In another aspect, the method further includes establishing, at the first base station, a communication channel between the first base station and wireless communication device based on the beamformed SRS. In another aspect, the downlink communication is transmitted using at least one antenna of the first base station operable to transmit along the spatial direction based on the signal received from the wireless communication device, the first base station having a plurality of antennas operable to transmit along different spatial directions. In another aspect, the transmitting a downlink communication includes: transmitting the downlink communication along a path selected from among a plurality of paths based on the signal received from the wireless communication device. In another aspect, the downlink communication is established based on a beam codebook. In another aspect, the downlink communication is established based on a reciprocal beam calculation.

In another aspect of the disclosure, a wireless communication device in communication with a first base station is provided that includes a transceiver operable to receive an interfering signal from a second base station (or other base stations); and a computing device in communication with the transceiver, the computing device operable to determine a spatial direction of the interfering signal; wherein the transceiver is further operable to transmit a signal to the first base station based on the spatial direction of the interfering signal.

In another aspect of the disclosure, the transceiver is operable to transmit the signal to the first base station by transmitting a beamformed sounding reference signal (SRS) to the first base station. In another aspect, the beamformed SRS has a spatial direction that limits interference from the interfering signal. In another aspect, the computing device is further operable to establish the beamformed SRS based on a beam codebook. In another aspect, the computing device is further operable to establish the beamformed SRS based on a calculation associated with interference from the interfering signal. In another aspect, the transceiver is further operable to: receive a downlink communication from the base station, wherein downlink communication layers are beamformed in the spatial direction(s) based on the signal transmitted to the first base station. In another aspect, the transceiver is operable to transmit the signal to the first base station by: transmitting multiple signals to the first base station based on the spatial direction of the interfering signal. In another aspect, the multiple signals are transmitted simultaneously. In another aspect, the multiple signals each have a different phase. In another aspect, the multiple signals are transmitted sequentially over time. In another aspect, the multiple signals each have a different phase. In another aspect, the transceiver is operable to transmit the multiple signals by: transmitting at least one sounding reference signal (SRS) via a first antenna in communication with the transceiver at a first time; and transmitting at least one SRS via a second antenna in communication with the transceiver at a second time.

In another aspect of the disclosure, a base station is provided that includes a transceiver operable to: receive a signal from a wireless communication device, the signal based on a spatial direction of an interfering signal received by the wireless communication device from a second base station (or other base stations); and transmit a downlink communication to the wireless communication device, wherein downlink communication layers are beamformed in the spatial direction(s) based on the signal received from the wireless communication device.

In another aspect of the disclosure, a transceiver operable to receive a signal from the wireless communication device by: receiving a beamformed sounding reference signal (SRS). In another aspect, the beamformed SRS has a spatial direction that limits interference at the wireless communication device from the interfering signal. In another aspect, the base station further comprises: a computing device in communication with the transceiver, the computing device operable to establish a communication channel with the wireless communication device based on the beamformed SRS. In another aspect, the base station further comprises a plurality of antennas in communication with the transceiver and operable to transmit along different spatial directions, wherein the downlink communication is transmitted using at least one antenna operable to transmit along the spatial direction based on the signal received from the wireless communication device. In another aspect, the transceiver is operable to transmit a downlink communication by: transmitting the downlink communication along a path selected from among a plurality of paths based on the signal received from the wireless communication device. In another aspect, the base station further comprises a computing device operable to establish the downlink communication based on a beam codebook. In another aspect, the base station further comprises a computing device operable to establish the downlink communication based on a reciprocal beam calculation.

In another aspect of the disclosure, a wireless communication device in communication with a first base station is provided that includes means for receiving an interfering signal from a second base station (or other base stations); means for determining a spatial direction of the interfering signal; and means for transmitting a signal to the first base station based on the spatial direction of the interfering signal.

In another aspect of the disclosure, the means for transmitting a signal to the first base station includes: means for transmitting a beamformed sounding reference signal (SRS) to the first base station. In another aspect, the beamformed SRS has a spatial direction that limits interference from the interfering signal. In another aspect, the means for transmitting a beamformed sounding reference signal (SRS) includes: means for establishing the beamformed SRS based on a beam codebook. In another aspect, the means for transmitting a beamformed sounding reference signal (SRS) includes: means for establishing the beamformed SRS based on a calculation associated with interference from the interfering signal. In another aspect, the wireless communication device further includes means for receiving a downlink communication from the base station, wherein downlink communication layers are beamformed in the spatial direction(s) based on the signal transmitted to the first base station. In another aspect, the means for transmitting the signal to the first base station includes means for transmitting multiple signals to the first base station based on the spatial direction of the interfering signal. In another aspect, the means for transmitting multiple signals includes means for transmitting the multiple signals simultaneously. In another aspect, the multiple signals each have a different phase. In another aspect, the means for transmitting multiple signals includes means for transmitting the multiple signals sequentially over time. In another aspect, the multiple signals each have a different phase. In another aspect, the means for transmitting multiple signals includes means for transmitting at least one sounding reference signal (SRS) at a first time; and means for transmitting at least one SRS at a second time.

In another aspect of the disclosure, a base station is provided that includes means for receiving a signal from a wireless communication device, the signal based on a spatial direction of an interfering signal received by the wireless communication device from a second base station (or other base stations); and means for transmitting a downlink communication to the wireless communication device, wherein downlink communication layers are beamformed in the spatial direction(s) based on the signal received from the wireless communication device.

In another aspect of the disclosure, the means for receiving a signal from the wireless communication device includes means for receiving a beamformed sounding reference signal (SRS). In another aspect, the beamformed SRS has a spatial direction that limits interference at the wireless communication device from the interfering signal. In another aspect, the base station further includes means for establishing a communication channel with the wireless communication device based on the beamformed SRS. In another aspect, the base station further includes means for transmitting along different spatial directions, wherein the downlink communication is transmitted along the spatial direction based on the signal received from the wireless communication device. In another aspect, the means for transmitting a downlink communication includes: means for transmitting the downlink communication along a path selected from among a plurality of paths based on the signal received from the wireless communication device. In another aspect, the means for transmitting a downlink communication includes: means for establishing the downlink communication based on a beam codebook. In another aspect, the means for transmitting a downlink communication includes means for establishing the downlink communication based on a reciprocal beam calculation.

Additional aspects, features, and advantages of the present disclosure will become apparent from the following detailed description.

DETAILED DESCRIPTION

Figure 1:
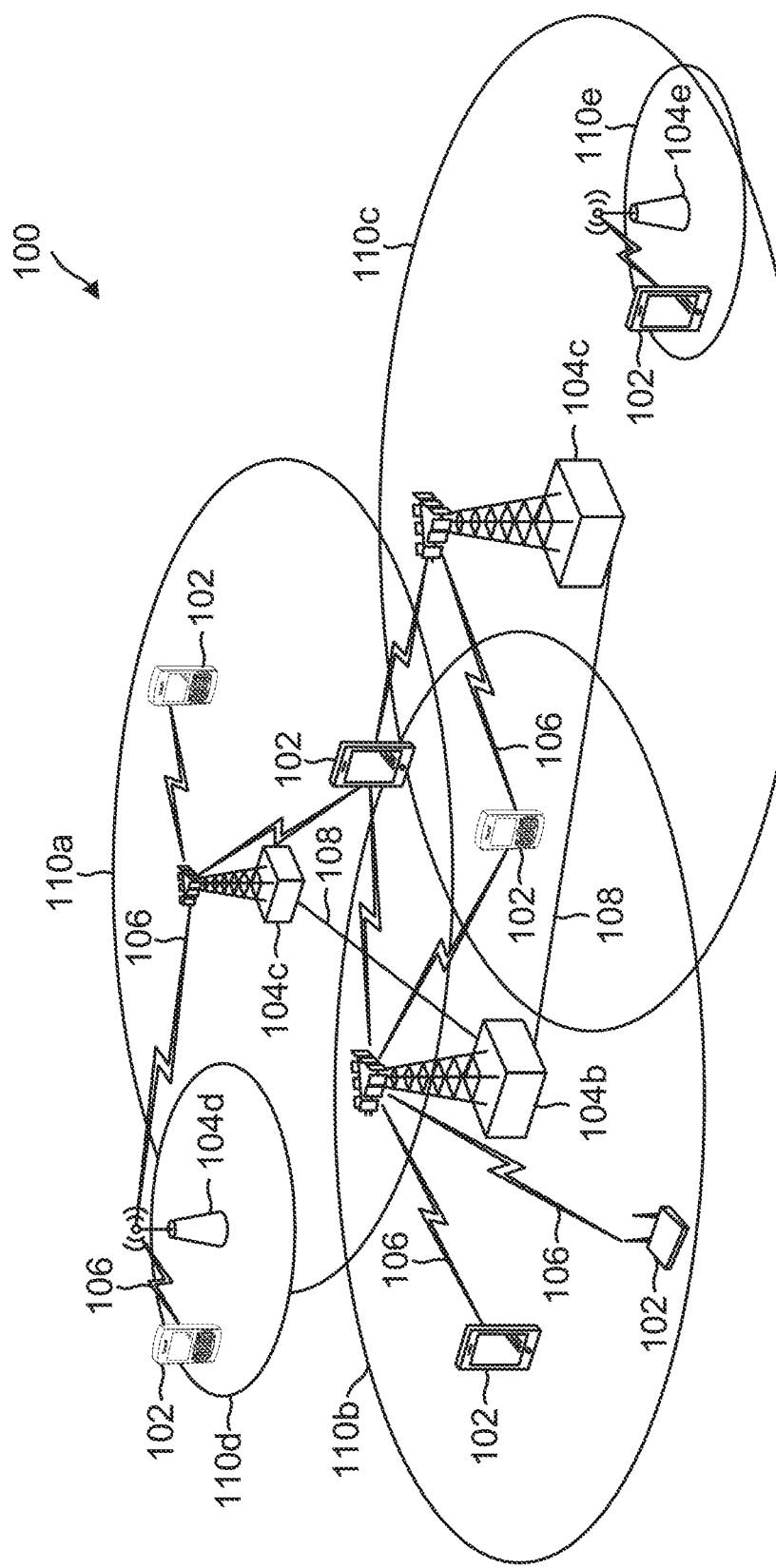
FIG. 1 illustrates a wireless communication network, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

The present disclosure describes communication between user equipment (UE) and a base station that accounts for the spatial direction of an interfering signal received by the UE. The UE can experience interference that results from downlink signals transmitted by another base station to another UE. The UE determines the direction of the interfering signal and transmits a signal to the base station based on the direction of the interfering signal. For example, the signal can be a beamformed sounding reference signal (BF-SRS) that has a spatial direction that limits interference from the interfering signal. The base station receives the signal from the UE and transmits downlink communication that is beamformed in the spatial direction based on the signal received from the UE. The base station is thus able to transmit a focused beam that accounts from the spatial direction of interference received by the UE. The UE receives downlink communications along a spatial direction that limits interference.

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB). A base station may also be referred to as a base transceiver station, a node B, or an access point. A base station 104 may be a station that communicates with the UEs 102 and may also be referred to as a base station, a node B, an access point, and the like.

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. A base station for a femto cell may be referred to as a femto base station or a home base station.

In the example shown in FIG. 1, the base stations 104a, 104b and 104c are examples of macro base stations for the coverage areas 110a, 110b and 110c, respectively. The base stations 104d and 104e are examples of pico and/or femto base stations for the coverage areas 110d and 110e, respectively. As will be recognized, a base station 104 may support one or multiple (e.g., two, three, four, and the like) cells.

The wireless network 100 may also include relay stations. A relay station is a station that receives a transmission of data and/or other information from an upstream station (e.g., a base station, a UE, or the like) and sends a transmission of the data and/or other information to a downstream station (e.g., another UE, another base station, or the like). A relay station may also be a UE that relays transmissions for other UEs. A relay station may also be referred to as a relay base station, a relay UE, a relay, and the like.

The wireless network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
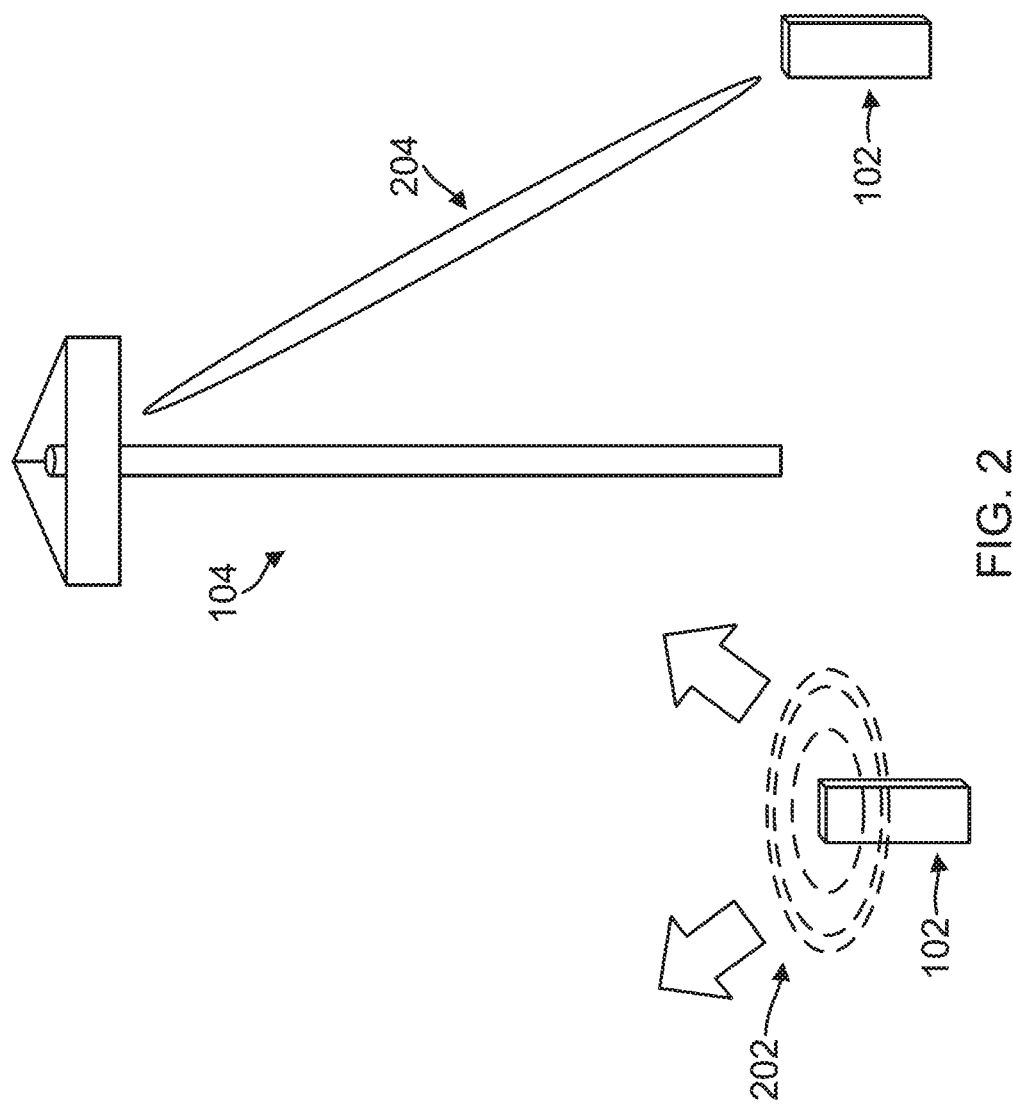
FIG. 2 illustrates a wireless communication network which uses sounding reference signals to enable beamforming at a base station, in accordance with various aspects of the present disclosure.

Referring now to FIG. 2, there is shown an example of a system that may be used to enhance the efficiency of use of available bandwidth in wireless communications channels between one or more UEs 102 and one or more base stations 104, as discussed above with respect to FIG. 1. FIG. 2 illustrates one base station 104 and one UE 102 for purposes of simplicity of discussion, though it will be recognized that embodiments of the present disclosure may scale to many more UEs 102 and/or base stations 104. The UE 102 and the base station 104 may communication with each other at various frequencies. For example, in one embodiment the UE 102 and the base station 104 may communicate at sub-6 GHz frequencies, while in another embodiment at above 6 GHz frequencies, to name just two examples.

UE 102 broadcasts a sounding reference signal (SRS) 202 that is received by base station 104. In an embodiment, the SRS 202 may be an omni-directional transmission, while in another embodiment the SRS 202 may be a wide-beam transmission. Upon receipt of the SRS 202, the base station 104 is able to gather from the SRS 202, either explicitly or implicitly, channel information for the uplink channel between the UE 102 and the base station 104. The base station 104 may then use that uplink channel information to train its antennas to beamform a downlink 204 to the same UE 102.

Figure 3:
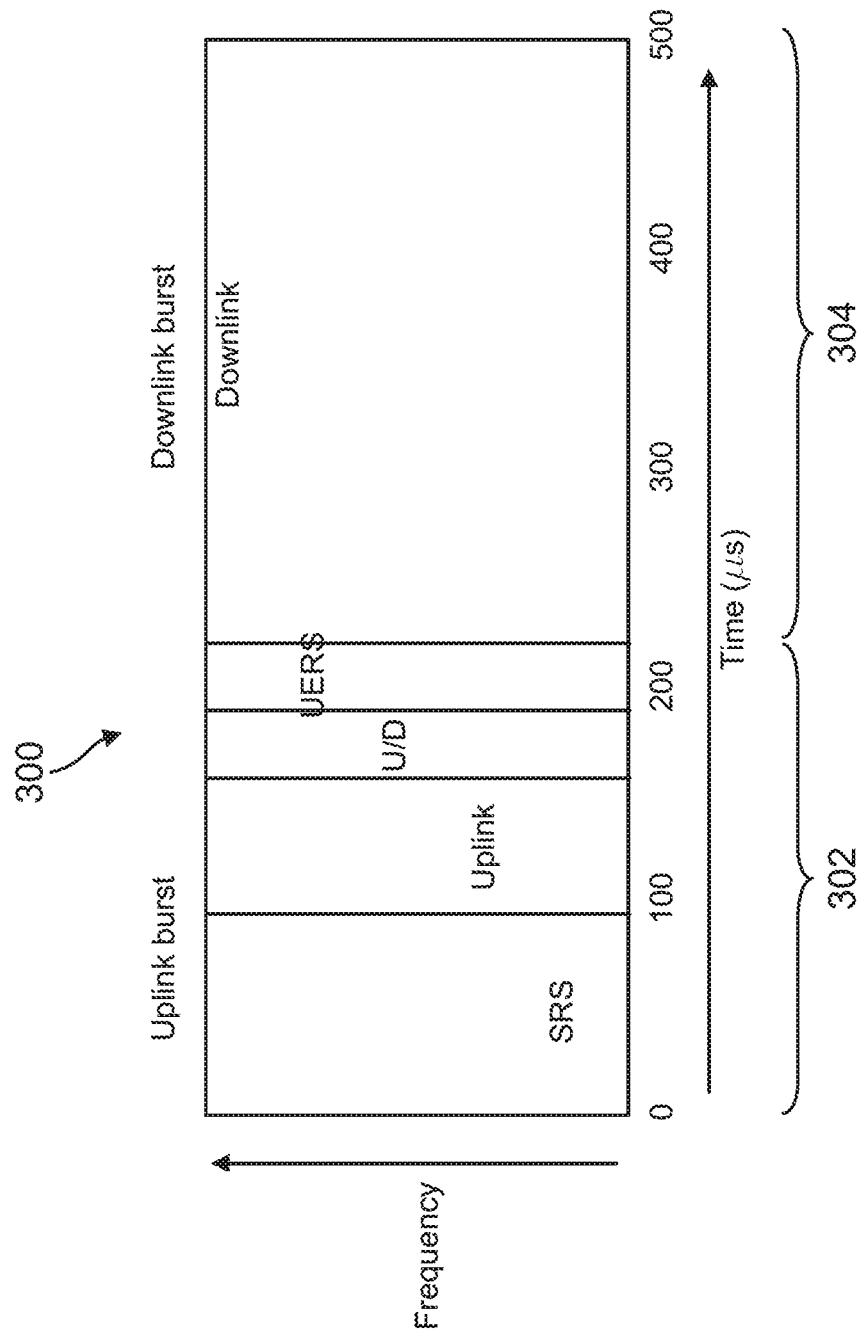
FIG. 3 illustrates an exemplary subframe structure, in accordance with various aspects of the present disclosure.

To derive the most advantage from reciprocity (applying channel information obtained from the SRS 202 in the uplink), the base station 104 may rapidly re-apply that information (by training) for beamforming (or focusing) a downlink transmission to the UE 102 so as to minimize the effects of channel decorrelation. To assist in the rapid-reapplication of the channel information in the downlink, embodiments of the present disclosure utilize a short subframe structure. Referring now to FIG. 3, an exemplary subframe structure 300 is illustrated that operates within a short timeframe so as to minimize the effects of decorrelation in the channel. In an embodiment, the short timeframe may be approximately 500 microseconds, though it may also be shorter or longer than that. The short timeframe allows the base station 104 to essentially "freeze" the channel state for the duration of the subframe, during which the base station 104 may train and form the beam for the downlink and then provide a downlink burst.

Communications between UE 102 and base station 104 can be divided in the time domain into subframes (SFs) 300, such as the SF 300 illustrated in FIG. 3. A single subframe is illustrated in FIG. 3 for ease of illustration; as will be recognized, the structure of the SF 300 is scalable to any number of subframes as necessary or desired. Each SF 300 is divided into an uplink (UL) portion 302 and a downlink (DL) portion 304, separated by a transition portion U/D. As part of the UL portion 302, the UE 102 may send various types of signals to the base station 104. These may include, for example, an SRS (used here for transmit beamforming at the base station and in place of the uplink DMRS), uplink data, and optionally requests for information. The transition portion U/D is provided between the UL portion 302 and the DL portion 304. During the DL portion, the base station 104 sends various types of signals to the UE 102, including for example a user-equipment reference signal (UERS) and downlink data (e.g., in a downlink burst).

In some embodiments, the base station 104 may use the SRS in the UL portion 302 derive multiple pieces of information that facilitate the downlink between the UE 102 and the base station 104. For example, based on the SRS the base station 104 having multiple antennas is able to train its antennas to beamform the DL data transmitted back to the UE 102 so that, for instance, interference with other wireless communication devices in the range of the base station 104 is reduced. Beamforming relies on information about the channel between the UE 102 and the base station 104 that the base station 104 derives from the uplink SRS and then applies to the downlink based on reciprocity. The base station 104 can retrain its antennas as the channel changes over time (e.g., periodically or randomly), for example according to subsequent SRS received from the UE 102. This may happen, for example, if the UE 102 is moving or if other moving objects enter or leave the area/interfere with the uplink (or downlink) channel According to embodiments of the present disclosure, the subframe 300 is provided as part of a synchronous system, such that the subframe 300 is provided repeatedly over time so that the base station 104 may retrain the beams to accommodate for UE 102 motion and channel decorrelation related to that movement (and/or other influences).

Channel reciprocity may allow the base station 104 to apply information about the channel in the UL direction to estimate one or more channel properties in the DL direction, which can be used to beamform the DL transmissions. In this manner, the base station 104 can train its antennas based on the SRS from the UE 102. The SRS may further include information that allows the base station 104 to demodulate data received from the UE 102 during the UL portion of the SF 300. The base station 104 may additionally determine, from the SRS, scheduling information that allows the base station 104 to schedule future SFs 300 (e.g., frequency bands, etc.) for communicating with the UE 102. Exemplary structures for the SF 300 are described in U.S. patent application Ser. No. 14/866,794, filed on an even date herewith, and the entirety of which is hereby incorporated by reference.

Figure 4:
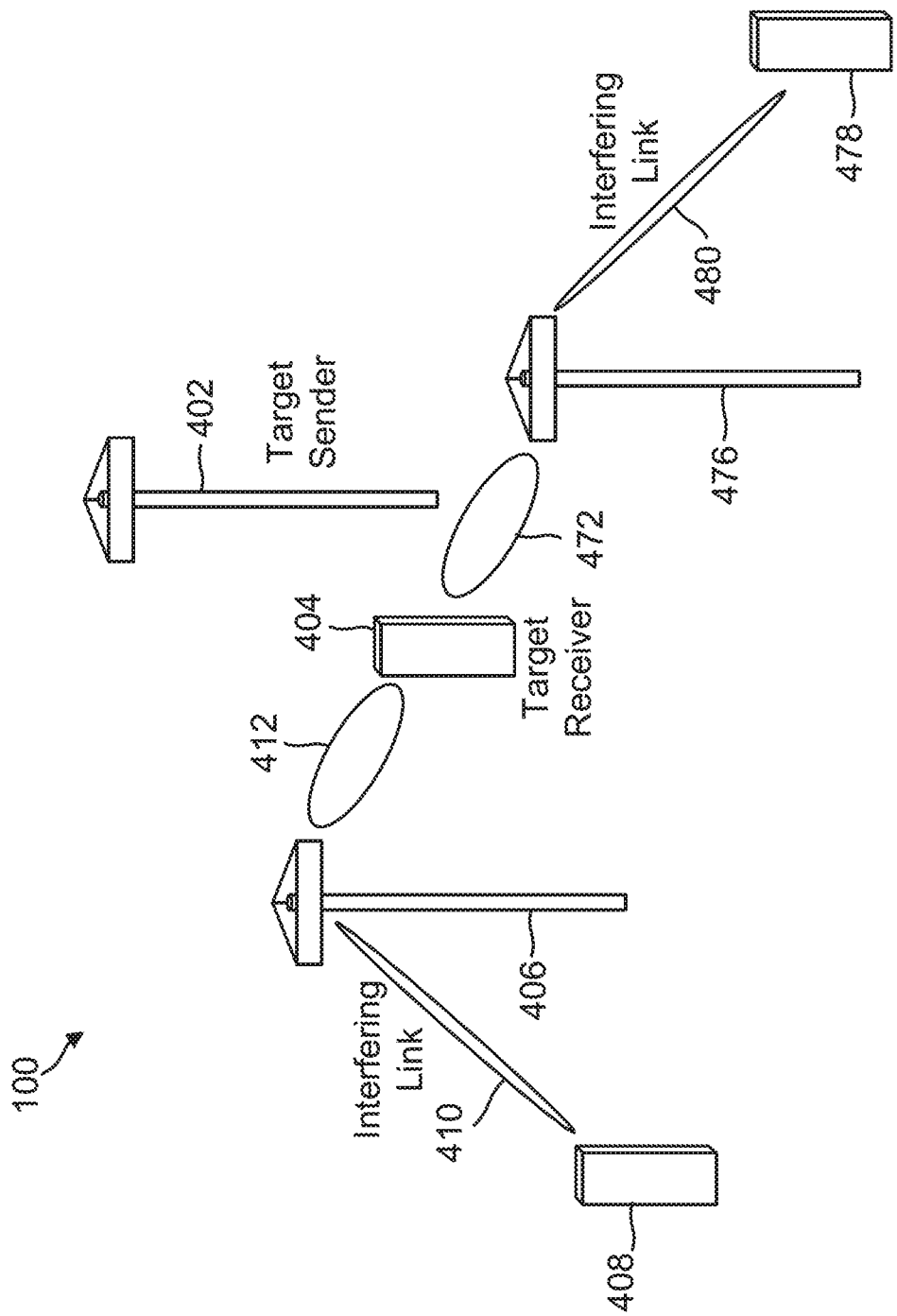
FIG. 4 illustrates a portion of a wireless communication network in which an interfering signal is received at user equipment, in accordance with various aspects of the present disclosure.

FIG. 4 is a diagram of a portion of the wireless network 100 according to embodiments of the present disclosure. The wireless network 100 may include base stations 402 and 406, and user equipments (UEs) 404 and 408.

According to aspects of the present disclosure, communication between a target receiver, such as the UE 404, and a target sender, such as the base station 402, accounts for interference experienced by the target receiver. In the illustrated embodiment of FIG. 4, base station 402 is in communication with UE 404, and the base station 406 is in communication 408. For example, the base station 406 serves downlink communication, as indicated by the communication signal 410, to the UE 408. As a result of the base station 406 communicating with the UE 408, interference can be experienced by other UEs in the network, including UE 404. Despite the fact that base station 406 may focus the beam 410 in the direction of UE 408, the UE 404 can receive interference from an interfering signal 412. The interfering signal 412 can be a component of the beam 410, such as a side lobe or back lobe of a beam transmitted by a directional antenna of the base station 406. The UE 404 receives the interfering signal 412 and determines the spatial direction associated therewith. Mathematically, the UE 404 can determine the correlation matrix $R_{nn}$ of the noise.

The UE 404 may receive interfering signals from more than one base station that are in communication with respective UEs. For example, the UE 404 can receive interfering signals 412 and 472 from base stations 406 and 476, respectively. Base station 406 is in communication with UE 408 (as indicated by the beam 410), and base station 476 is in communication with UE 478 (as indicated by the beam 480). The interfering base stations (e.g., base stations 406 and 476) can be variously spatially positioned relative to the UE 404. The present disclosure contemplates that the UE 404 and/or its serving base station 402 can account for the spatial directions of multiple interfering signals received from multiple base stations.

While the present disclosure may refer to cellular network including UEs and base stations, it is understood that the features described herein can be generally applied to communication between any target receiver and any target sender in a wireless communication network. For example, the features described herein could be implemented in the WiFi system for communication between a UE and a base station or access point.

The UE 404 can account for the spatial direction of the interfering signal 412 when it transmits a sounding reference signal (SRS) to the base station 402. In some embodiments, the UE 404 can include more than one antenna, such that directionally specific information can be communicated. For example, the UE 404 can be operable to transmit information indicative of which spatial direction(s) are undesirable or less desirable (e.g., because of interference) and/or which spatial direction(s) are more desirable (e.g., an direction that experience less interference).

Figure 5:
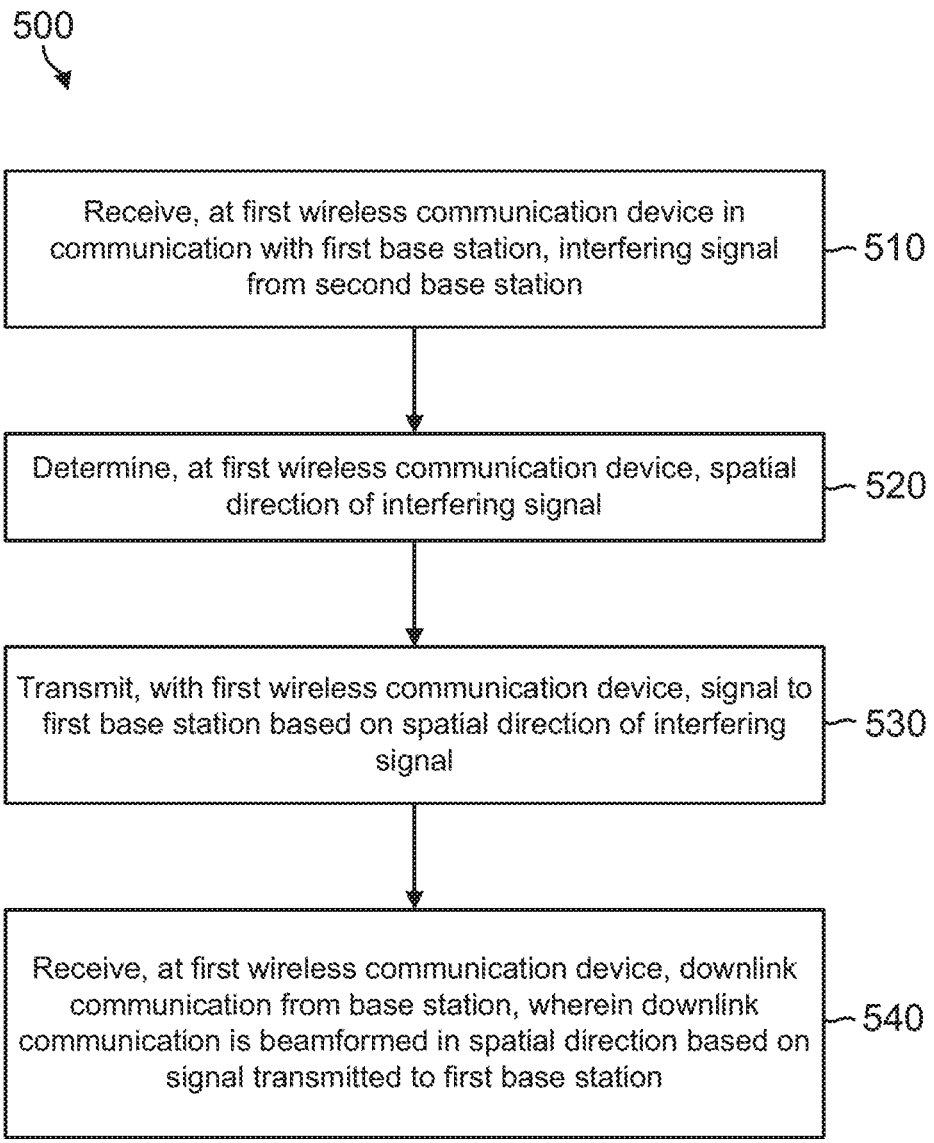
FIG. 5 is a flow diagram of a wireless communication method, in accordance with various aspects of the present disclosure.

FIG. 5 is a flow diagram of a method 500 of wireless communication. Steps of the method 500 can be executed by a computing device (e.g., a processor, processing circuit, and/or other suitable component) of a wireless communication device, such as the UE 404, for example. The method 500 can be better understood with reference to FIGS. 1-4 and 7-13. As illustrated, the method 500 includes a number of enumerated steps, but embodiments of the method 500 may include additional steps before, after, and in between the enumerated steps. In some embodiments, one or more of the enumerated steps may be omitted or performed in a different order.

At step 510, the method 500 includes receiving, at a wireless communication device (e.g., the UE 404) in communication with a first base station (e.g., the base station 402), an interfering signal from a second base station (or other base stations) (e.g., the base station 406). At step 520, the method 500 includes determining, at the wireless communication device, a spatial direction of the interfering signal. At step 530, the method 500 includes transmitting, with the wireless communication device, a signal to the first base station based on the spatial direction of the interfering signal. Transmitting the signal to the first base station (step 530) can include transmitting a beamformed sounding reference signal (SRS) to the first base station, as described in greater detail with respect to FIG. 8.

The beamformed SRS can have a spatial direction that limits interference from the interfering signal. The beamformed SRS can be established based on a beam codebook. The beamformed SRS can also be established based on a calculation associated with interference from the interfering signal. Transmitting the signal to the first base station (step 530) can include transmitting, with the wireless communication device, multiple signals to the first base station based on the spatial direction of the interfering signal. Transmitting multiple signals is described in greater detail with respect to FIGS. 12 and 13. The multiple signals can be transmitted simultaneously or sequentially over time. Transmitting the multiple signals can include transmitting at least one sounding reference signal (SRS) via a first antenna of the mobile communication device at a first time; and transmitting at least one SRS via a second antenna of the mobile communication device at a second time. At step 540, the method 500 includes receiving, at the first wireless communication device, a downlink communication from the base station. The downlink communication layers are beamformed in the spatial direction(s) based on the signal transmitted to the first base station.

Figure 6:
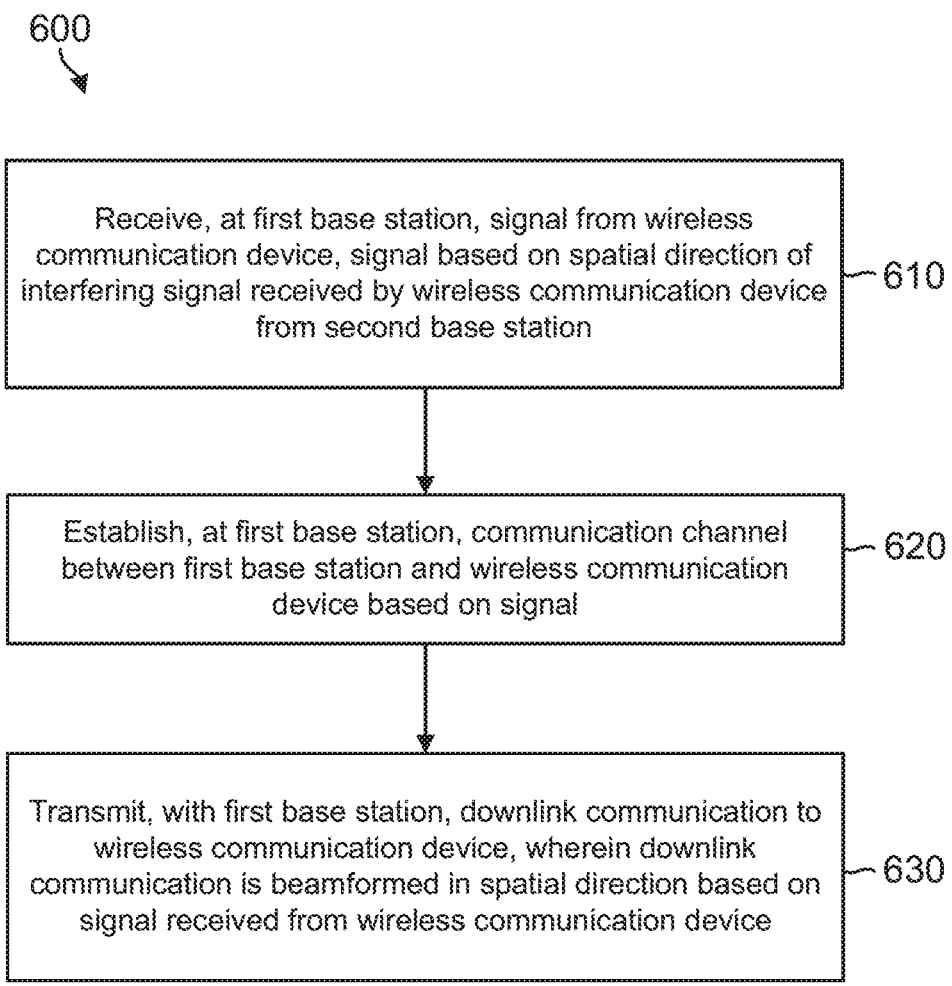
FIG. 6 is a flow diagram of a wireless communication method, in accordance with various aspects of the present disclosure.

FIG. 6 is a flow diagram of a method 600 of wireless communication. Steps of the method 600 can be executed by a computing device (e.g., a processor, processing circuit, and/or other suitable component) of a wireless communication device, such as the base station 402, for example. The method 600 can be better understood with reference to FIGS. 1-4 and 7-13. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 610, the method 600 includes receiving, at a first base station (e.g., the base station 402) a signal from a wireless communication device (e.g., UE 404). The signal may be based on a spatial direction of an interfering signal received by the wireless communication device from a second base station (or other base stations). Receiving a signal from a wireless communication device (step 610) can include receiving a beamformed sounding reference signal (SRS), as described in greater detail with respect to FIG. 8. The beamformed SRS can have a spatial direction that limits interference at the wireless communication device from the interfering signal. At step 620, the method 600 includes establishing, at the first base station, a communication channel between the first base station and wireless communication device based on the beamformed SRS. At step 630, the method 600 includes transmitting, with the first base station, a downlink communication to the wireless communication device. The downlink communication layers are beamformed in the spatial direction(s) based on the signal received from the wireless communication device. The downlink communication can be transmitted using at least one antenna of the first base station operable to transmit along the spatial direction based on the signal received from the wireless communication device, the first base station having a plurality of antennas operable to transmit along different spatial directions. Transmitting a downlink communication (step 630) can include transmitting the downlink communication along a path selected from among a plurality of paths based on the signal received from the wireless communication device. The downlink communication can be established based on a beam codebook and/or a reciprocal beam calculation.

Figure 7:
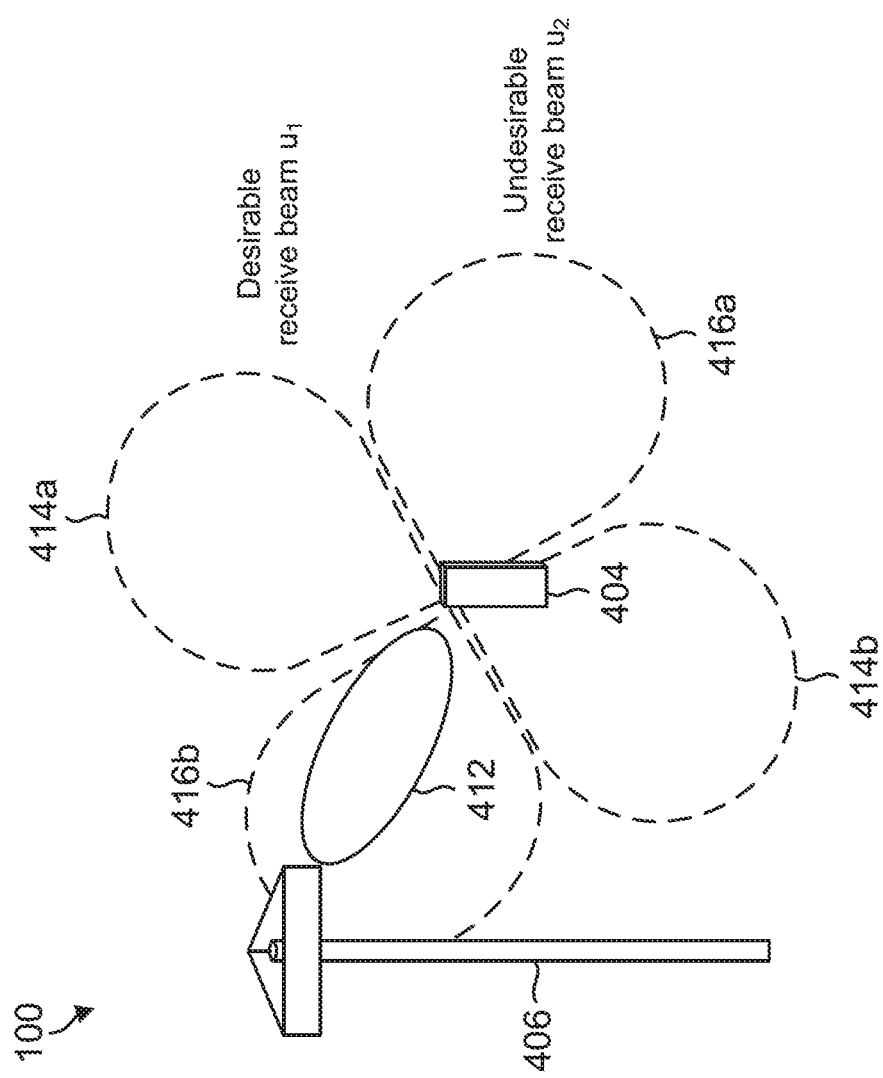
FIG. 7 illustrates a portion of a wireless communication network in which an interfering signal is received at user equipment, in accordance with various aspects of the present disclosure.

FIG. 7 illustrates a portion of the wireless network 100. The UE 404 receives interference from the interfering signal 412 from the interfering base station 406. The UE 404 can determine the direction(s) associated with the interfering signal 412 and direction(s) that do not suffer from interference. Based on the determined direction of the interfering signal 412, the UE 404 can determine desirable and undesirable directions to receive signals from its serving base station (e.g., the base station 402 of FIG. 4). In this manner, the UE 404 can direct its serving base station to use a beam that does not collide with the interfering signal 412. The UE 404 can also determine the direction of an undesirable receive beam $u_2$. The undesirable direction, relative to the UE 404 and interfering signal 412 in FIG. 7, includes the lobes 416a and 416b. As illustrated, the lobe 416b captures the power from the interfering signal 412. The UE 404 can direct its serving base station (e.g., the base station 402 of FIG. 4) to avoid transmitting along the direction of undesirable beam $u_2$. The UE 404 can also determine the direction of a desirable receive beam $u_1$. The desirable direction, relative to the UE 404 and interfering signal 412 in FIG. 7, includes the lobes 414a and 414b. The lobes 414a and 414b capture relatively little power from the interfering signal 412. The UE 404 can direct its serving base station to transmit along the direction of the desirable beam $u_1$. In the illustrated embodiment, the desirable spatial direction associated with beam $u_1$ is oriented relative to the interfering signal 412 such that the interference is substantially or completely nulled. Transmission along the direction of the desirable beam $u_1$ thus optimizes the spatial direction to minimize the interference from the interfering signal 412.

Figure 8:
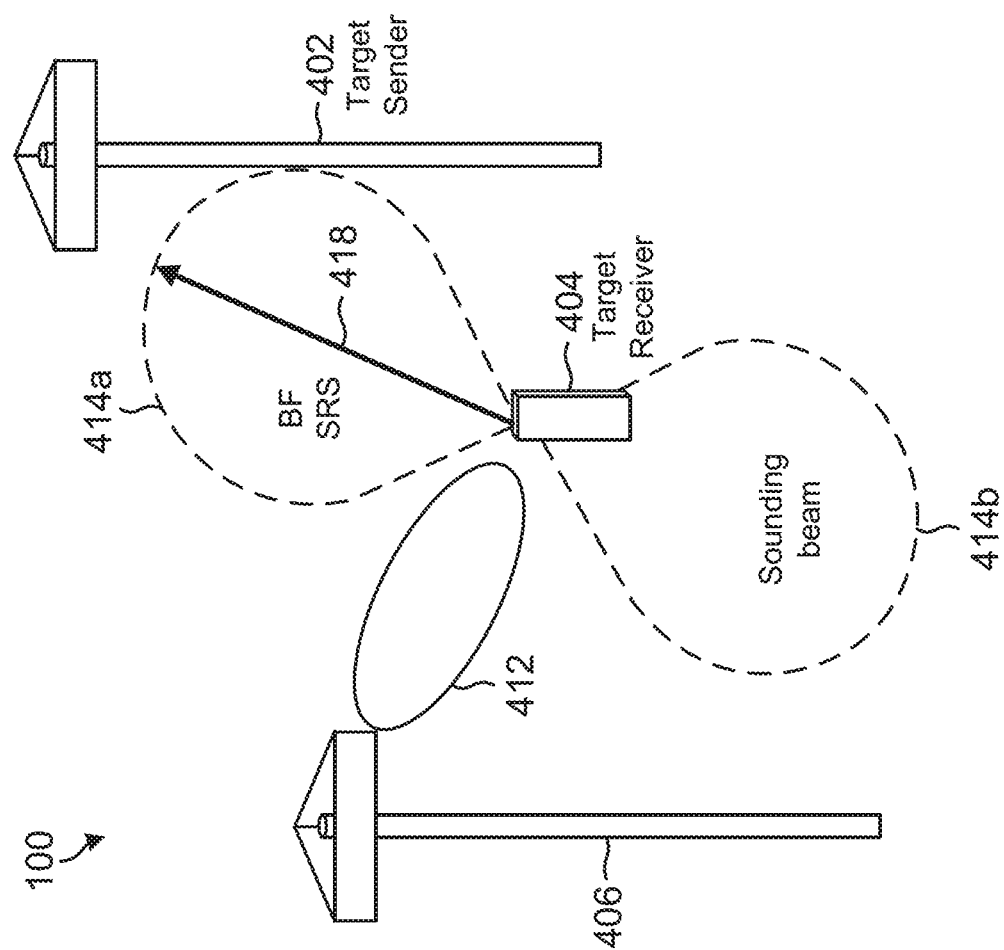
FIG. 8 illustrates a portion of a wireless communication network in which a beamformed sounding reference signal is transmitted from user equipment to a base station, in accordance with various aspects of the present disclosure.
Figure 9:
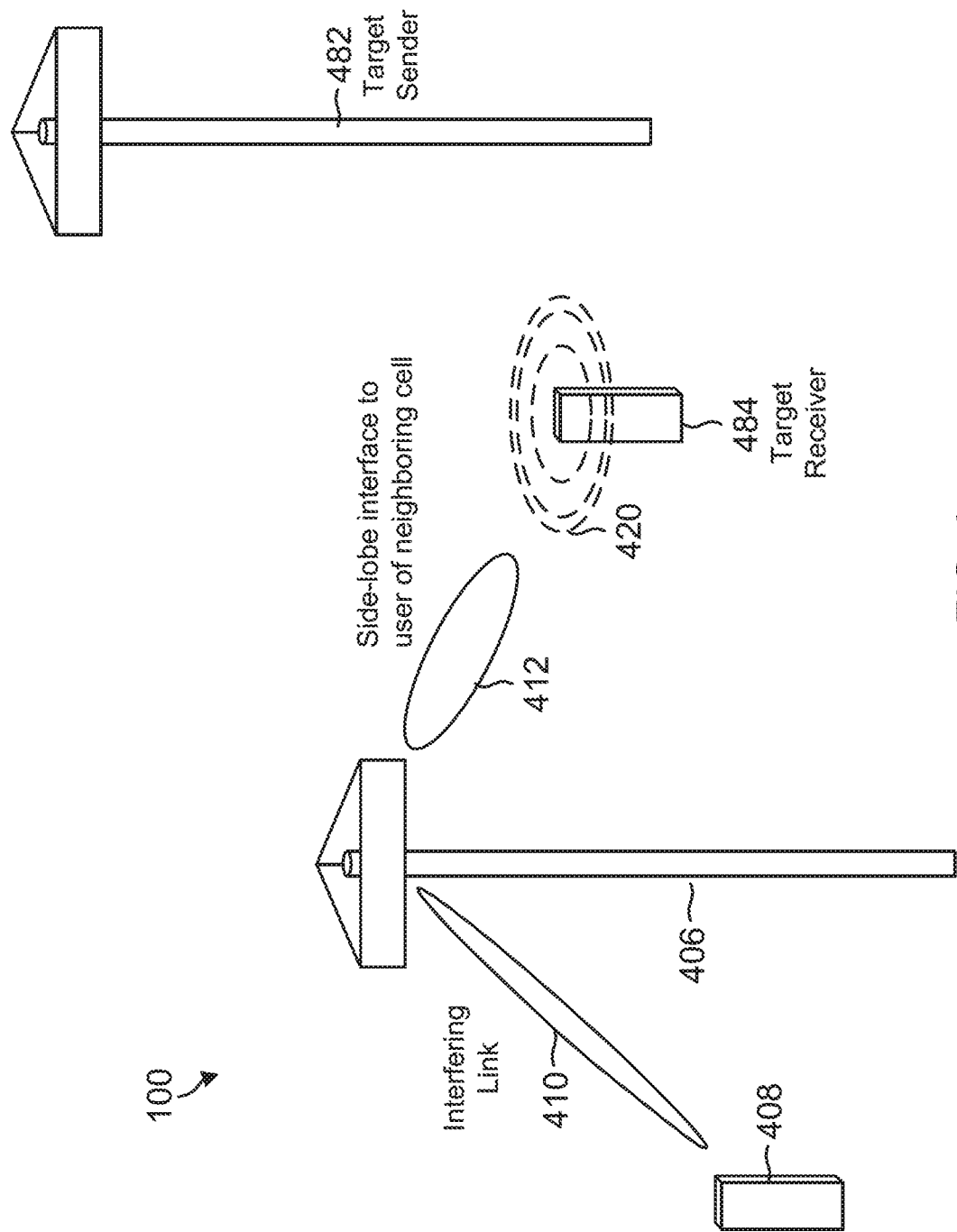
FIG. 9 illustrates a portion of a wireless communication network in an omnidirectional beamformed sounding reference signal is transmitted from user equipment to a base station, in accordance with various aspects of the present disclosure.

FIG. 8 illustrates a portion of the wireless network 100. The UE 404 can transmit a sounding beam or beamformed (BF) SRS 418 to its base station 402. The BF-SRS 418 can have spatial direction(s) based on the interference from the interfering signal 412. The UE 404 can determine the spatial direction of the BF-SRS 418 to be the same as the direction of the lobes 414a and 414b, which do not encompass (or minimize) the interfering signal 412 from the interfering base station 406. When the UE 404 receives interfering signals from multiple base stations, the BF-SRS 418 can have spatial direction(s) that limits interference from the multiple interfering signals. Transmitting the BF-SRS can be contrasted with an omni-directional sounding beam 420 illustrated in FIG. 9. In the embodiment of FIG. 9, the UE 484 does not communicate a direction of the interference from interfering signal 412 (or preferred direction of communication) with the sending of a single sounding beam 420. However, as discussed below with respect to FIG. 13, in some implementations omni-directional sounding beams can be utilized to communicate interference information and/or desired spatial communication direction(s).

Referring again to FIG. 8, the base station 402 can use the SRS to establish a communication channel with the UE 404, including channel estimation, that limits interferences from the interfering signal 412. In some embodiments, the BF-SRS 418 is established based on a beam codebook. In some embodiments, one or more parameters (magnitude, direction, etc.) of the BF-SRS 418 are calculated based on the interference received at the UE 404. For example, the calculations based on interference can determine to transmit the BF-SRS 418 along the null space of the correlation matrix $R_{nn}$ or more generally, based on whitened channel estimate, which is along a spatial direction that limits interference from the interfering signal 412. The calculations based on interference can also transmit the BF-SRS 418 such that the UE 404 sounds the whitened channel $R_{nn}^{-1/2}H$, which refers to a whitened channel that has been modified such that the interference on the channel has a Gaussian distribution.

Figure 10:
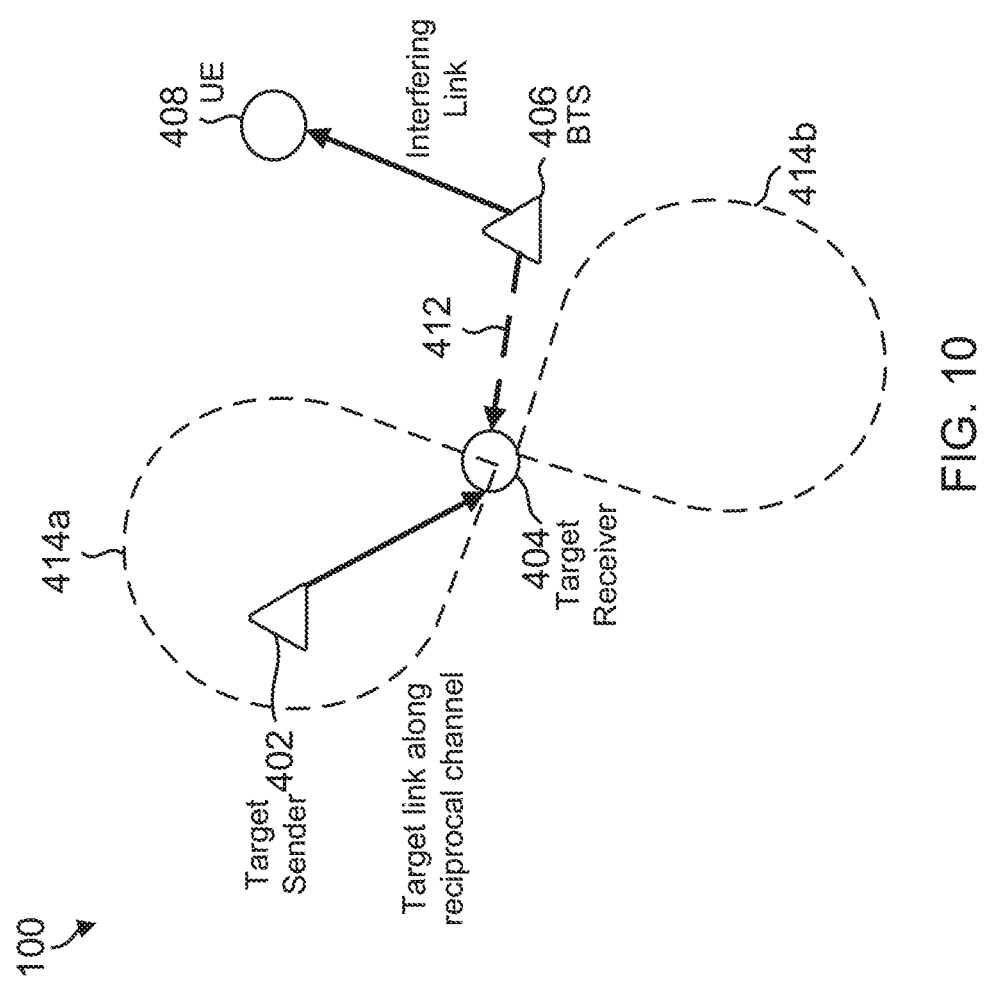
FIG. 10 illustrates a portion of a wireless communication network in which a downlink communication is transmitted by a base station to user equipment based on a beamformed sounding reference signal, in accordance with various aspects of the present disclosure.

FIG. 10 illustrates a portion of the wireless network 100. The base station 402 transmits a downlink communication to the UE 404 based on the BF-SRS received at the base station 402. The downlink communication comprises a narrow beam along the spatial direction of lobes 414a, 414b, as shown. Downlink communications may comprise one or more layers. The downlink communication layers are beamformed in the spatial direction(s) based on the BF-SRS transmitted to the base station 402. Accordingly, the UE 404 receives the downlink communication in a manner that limits interference from the interfering signal 412. The downlink communication can include one or more layers that are beamformed in direction(s) based on the interfering signal(s). In some embodiments, the downlink communication can include one or more layers that are beamformed in directions based on the sounding beam transmitted by the UE 404 that does not necessarily account for the interfering signal(s). For example, the downlink communication can include both layer(s) that do consider interfering signals and layer(s) that do not. In that regard, one or more layers of the downlink communication can be beamformed in directions based on channel estimation and/or other steps performed by the UE 404 and/or the the base station 402 to establish communication that do not account for the directionality of interfering signals received by the UE 404. The beam associated with downlink communication can be a reciprocal beam that is determined based on the received BF-SRS and a beam codebook. In some embodiments, one or more parameters (magnitude, direction, etc.) of the downlink communication beam are determined using reciprocal beam calculation.

Figure 11:
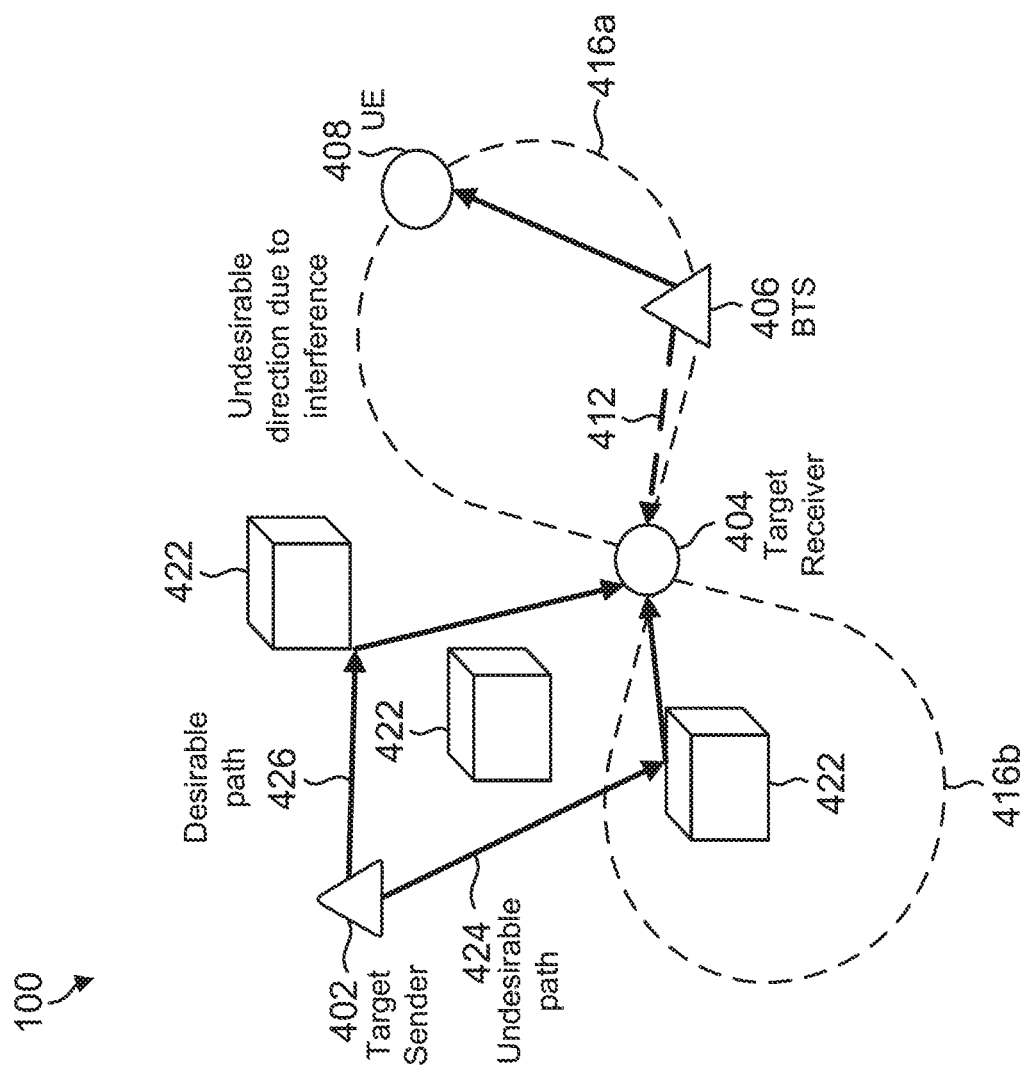
FIG. 11 illustrates a portion of a wireless communication network in which a path is selected among a plurality of paths, in accordance with various aspects of the present disclosure.

FIG. 11 illustrates a portion of the wireless network 100. The portion of the wireless network 100 shown in FIG. 11 includes obstructions 422. Obstructions 422 can be manmade or natural formations, such as buildings, mountains, etc., that are physically interposed between the base station 402 and the UE 404. Because of one or more obstructions 422, the base station 402 may encounter significant interference in attempts to transmit to the UE 404 along a direct path. Thus, the base station 402 may transmit along path 424 or 426 in an effort to communicate with the UE 404. The transmission beams along paths 424 and 426 can be deflected by one or more of the obstructions 422 before reaching the UE 404. According to aspects of the present disclosure, the base station 402 can choose to transmit along the path that limits the interference from the interfering signal 412 (e.g., path 426 in FIG. 11). Thus, the base station 402 can determine the direction that limits interference from among a plurality of available paths between the base station 402 and the UE 404 based on a received SRS from the UE 404.

Figure 12:
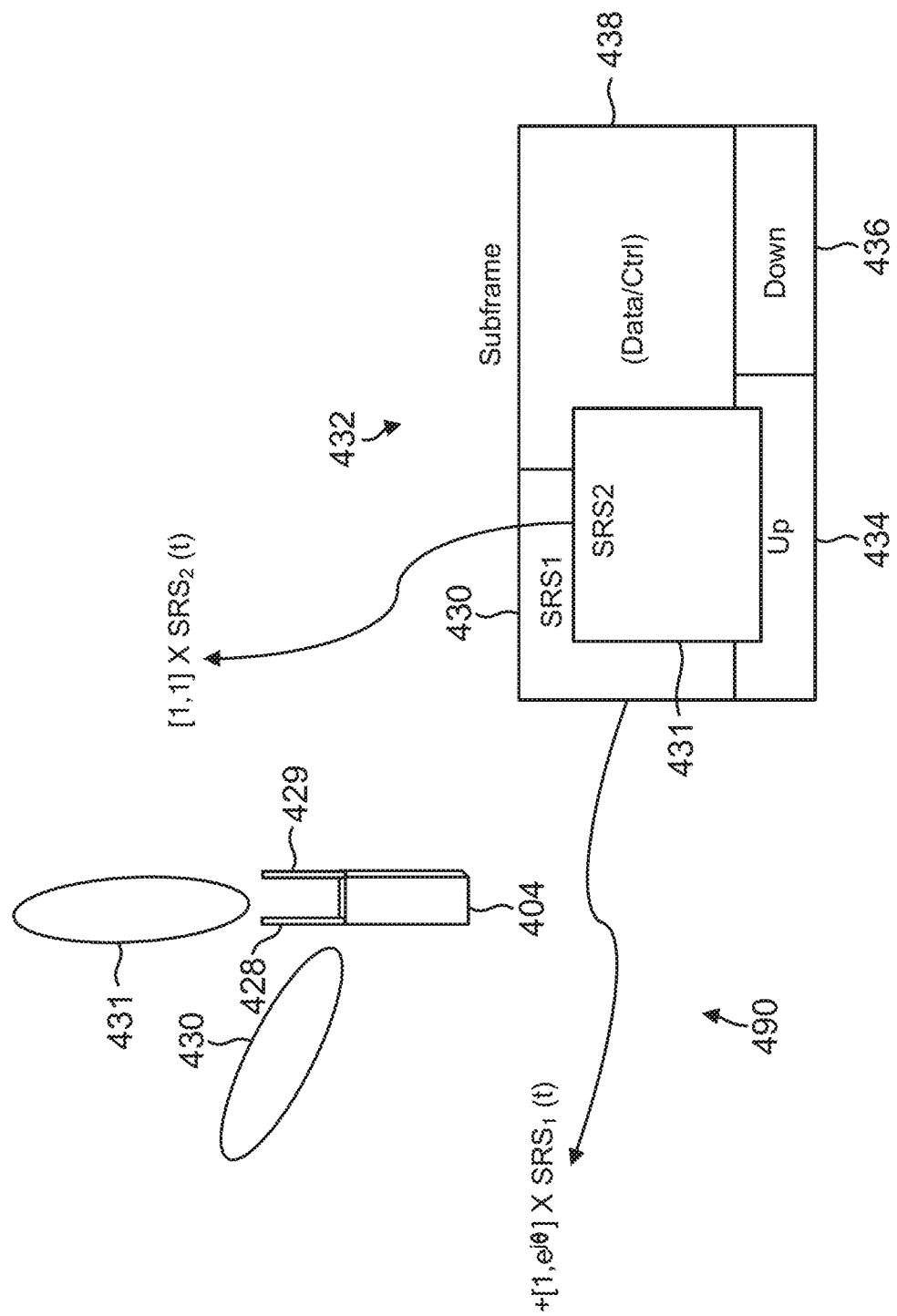
FIG. 12 illustrates a portion of a wireless communication network in which multiple sounding reference signals are transmitted by user equipment, in accordance with various aspects of the present disclosure.

FIG. 12 illustrates a communication environment 490 associated with an interference aware multiplexing scheme. In that regard, multiplexing can be implemented when the communication channel has relatively low levels of interference that allow the channel to support multiple transmissions. For example, in a single-user (SU) multiple input multiple output (MIMO) context, the channel rank associated with the UE 404 and its serving base station may be greater than one (1). A channel rank greater than one may be indicative channel with sufficiently low interference to support multiple transmissions.

The UE 404 may transmit multiple signals to its serving base station, based on the direction of an interfering signal. As shown in FIG. 12, for example, UE 404 can transmit SRS beams 430 and 431 during the uplink portion 434 of the subframe 432. While two SRS beams 430 and 431 are illustrated in FIG. 12, it is understood that any suitable number of SRS beams may be transmitted. In that regard, the SRS beams 430 and 431 may be multiplexed using non-orthogonal or orthogonal methods described in U.S. patent application Ser. No. 14/866,778, filed on an even date herewith, and the entirety of which is hereby incorporated by reference. For example, the multiple beams may be sent simultaneously or sequentially over time. In various embodiments, the multiple beams may be transmitted by one antenna or multiple antennas of the UE 404 (such as one or both of antennas 428 and 429). While FIG. 12 illustrates that the UE 404 has two antennas 428 and 429, the UE 404 can have one or more than two antennas in other embodiments.

Each SRS may be transmitted by a different transmit antenna or multiple SRSs can be transmitted by multiple antennas according to a method governed by a precode vector. In some embodiments, at least one sounding reference signal (SRS) is transmitted by a first antenna (e.g., the antenna 428) of the UE 404 at a first time and at least one SRS is transmitted by a second antenna (e.g., the antenna 429) of the UE 404 at a second time. In some embodiments, the SRS signals 430, 431 may be transmitted by multiple antennas with different phases. For example, SRS 430 may be transmitted by both antennas 428 and 429 with a first phase, and SRS 431 may be transmitted by both antennas 428 and 429 with a second phase. The phases of the SRS beams 430 and 431 can be indicative of the direction of the beams. The phases are mathematically shown by the example vectors $[1, e^{j\theta}]$ and $[1,1]$ operating on SRS 430 and SRS 431, respectively. Thus, one, more than one, or all of SRSs transmitted by the UE 404 are beamformed in a direction based on an interfering signal. Accordingly, the serving base station that receives the multiple SRS beams transmits downlink communication 438 to the UE 404 during the downlink portion 436 of the subframe 432 in a manner that limits interference received at the UE 404 (e.g., from an interfering signal, as described herein).

Figure 13:
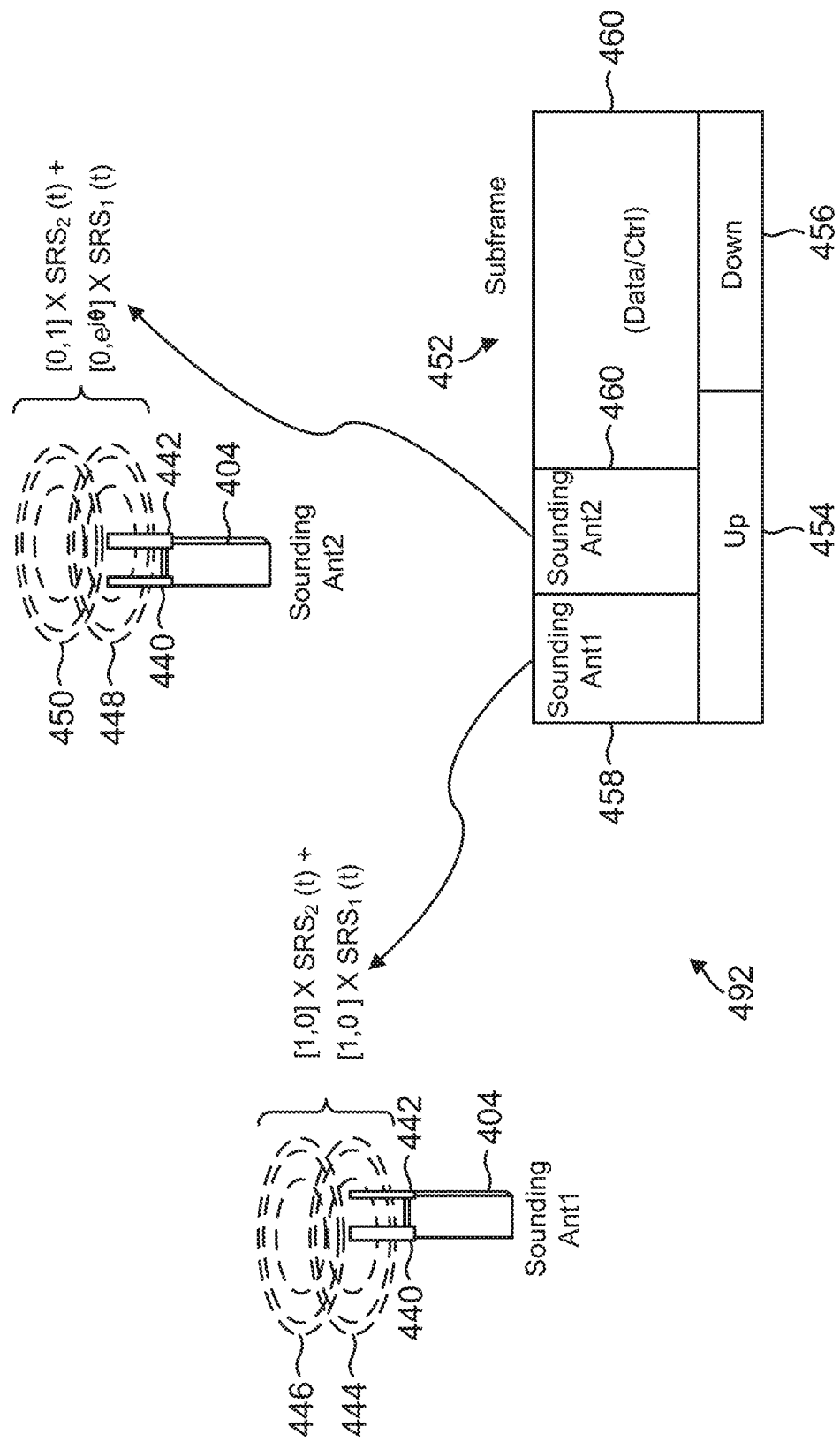
FIG. 13 illustrates a portion of a wireless communication network in which multiple sounding reference signals are transmitted by user equipment, in accordance with various aspects of the present disclosure.

FIG. 13 illustrates a communication environment 492 associated with an interference aware multiplexing scheme. The UE 404 includes multiple antennas but is operable to transmit on one antenna at a time. For example, the UE 404 can transmit on antenna 440 at a first time and on antenna 442 at a second time. Such a system can be implemented by switching the transmit chain, comprising the electronic components, such as the power amplifier and other components, across the transmit antennas. Because only one antenna is active at a time, each transmission may be omni-directional. As illustrated in FIG. 13, at a first segment 458 of the uplink portion 454 of the subframe 452, the antenna 440 transmits the two SRS beams 444 and 446. At a second segment 460 of the uplink portion 454, the antenna 442 transmits the two SRS beams 448 and 450. The SRS beams 444 and 446, and the SRS beams 448 and 450 can correspond to different MIMO streams and can be multiplexed in an orthogonal or non-orthogonal manner, as described with respect to FIG. 12. The receiving base station that receives SRS beams from the two segments 458 and 460 from the antennas 440 and 442 (as shown in FIG. 13) in effect receives the SRS beams 430 and 431 described in FIG. 12. In that regard, transmission of the SRS beams 444, 446, 448, and 450 may have different phases. For example, during the first segment 458, the antenna 440 may transmit SRS 444 and SRS 446 with a first phase. During the second segment 460, the antenna 442 may transmit SRS 448 and SRS 450 with a second phase. While the SRS beams 444, 446, 448, and 450 are each labeled distinctly, it is understood that SRS beams 444 and 448 may be identical except for differences in phase. Similarly, it is understood that the SRS beams 446 and 450 may be identical except for differences in phase. The phases of the SRS beams 444, 446, 448, and 450 can be indicative of the direction of the beams. The phases are mathematically shown by the example vectors operating on SRS beams 444, 446, 448, and 450 during the segments 458 and 460. Accordingly, the serving base station that receives the multiple SRS beams transmits a beamformed downlink communication 460 to the UE 404 during the downlink portion 456 of the subframe 452 in a manner based on the received SRS beams. The same technique could be applied to provide frequency division multiplexing (FDM) of interference aware SRS.

Figure 14:
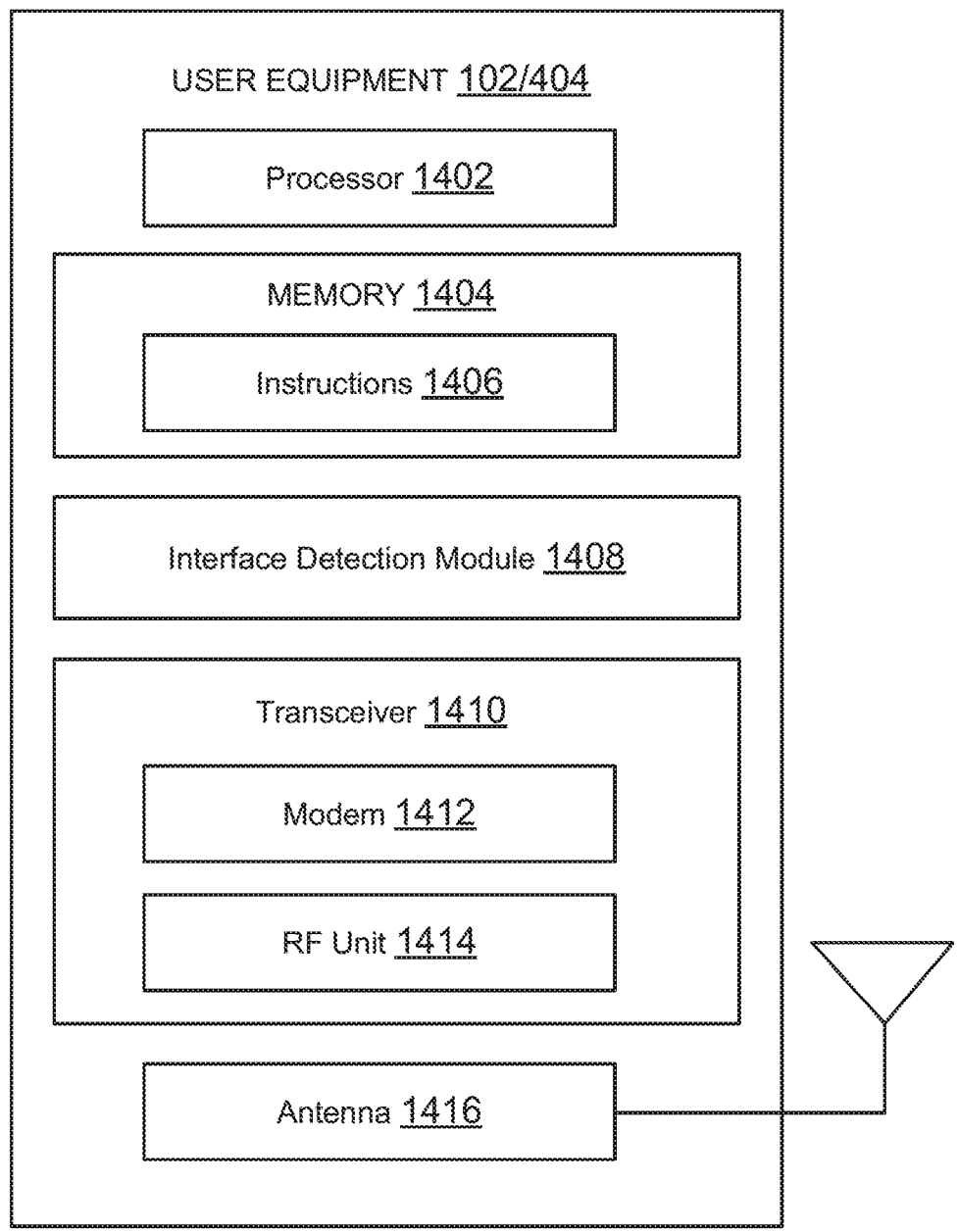
FIG. 14 is a block diagram of an exemplary wireless communication device, such as a user equipment, according to embodiments of the present disclosure.

FIG. 14 is a block diagram of an exemplary wireless communication device 1400 according to embodiments of the present disclosure. The wireless communication device 1400 may be a base UE 102 or 404 as discussed above. As shown, the UE 102 may include a processor 1402, a memory 1404, an interference detection module 1408, a transceiver 1410 (including a modem 1412 and RF unit 1414), and an antenna 1416. These elements may be in direct or indirect communication with each other, for example via one or more buses.

The processor 1402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to UEs 102 introduced above with respect to FIG. 1 and discussed in more detail above. In particular, the processor 1402 may be utilized in combination with the other components of the UE 102, including interference detection module 1408, to perform the various functions associated with determining whether there is interference in the uplink channel, what spatial direction interference is coming from, and how to structure an SRS to the base station 104/402 to avoid the interference as described in greater detail above. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1404 includes a non-transitory computer-readable medium. The memory 1404 may store instructions 1406. The instructions 1406 may include instructions that, when executed by the processor 1402, cause the processor 1402 to perform the operations described herein with reference to the UEs 102 in connection with embodiments of the present disclosure. Instructions 1406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The interference detection module 1408 may be used for various aspects of the present disclosure. For example, the interference detection module 1408 may determine that there is interference in the uplink channel due to, for example, other base stations 406, 476 transmitting to other UEs 408, 478 and creating sidelobe or backlobe transmissions in the process. The interference detection module 1408 may then use the determined interference to structure a beamformed SRS to the base station 104/402 based on the spatial direction of the interference.

As shown, the transceiver 1410 may include the modem subsystem 1412 and the radio frequency (RF) unit 1414. The transceiver 1410 can be configured to communicate bi-directionally with other devices, such as base stations 104. The modem subsystem 1412 may be configured to modulate and/or encode the data from the interference detection module 1408 and other aspects of the UE 102, such as processor 1402 and/or memory 1404, according to a modulation and coding scheme (MCS), e.g., a low-density parity check (LDPC) coding scheme, a turbo coding scheme, a convolutional coding scheme, etc. The RF unit 1414 may be configured to process (e.g., perform analog to digital conversion or digital to analog conversion, etc.) modulated/encoded data from the modem subsystem 1412 (on outbound transmissions) or of transmissions originating from another source such as a UE 102 or a base station 104. Although shown as integrated together in transceiver 1410, the modem subsystem 1412 and the RF unit 1414 may be separate devices that are coupled together at the UE 102 to enable the UE 102 to communicate with other devices.

The RF unit 1414 may provide the modulated and/or processed data, e.g. data packets (or, more generally, data messages that may contain one or more data packets and other information), to the antenna 1416 for transmission to one or more other devices. This may include, for example, transmission of an SRS according to embodiments of the present disclosure. The antenna 1416 may further receive data messages transmitted from other devices and provide the received data messages for processing and/or demodulation at the transceiver 1410. Although FIG. 14 illustrates antenna 1416 as a single antenna, antenna 1416 may include multiple antennas of similar or different designs in order to sustain multiple transmission links.

Figure 15:
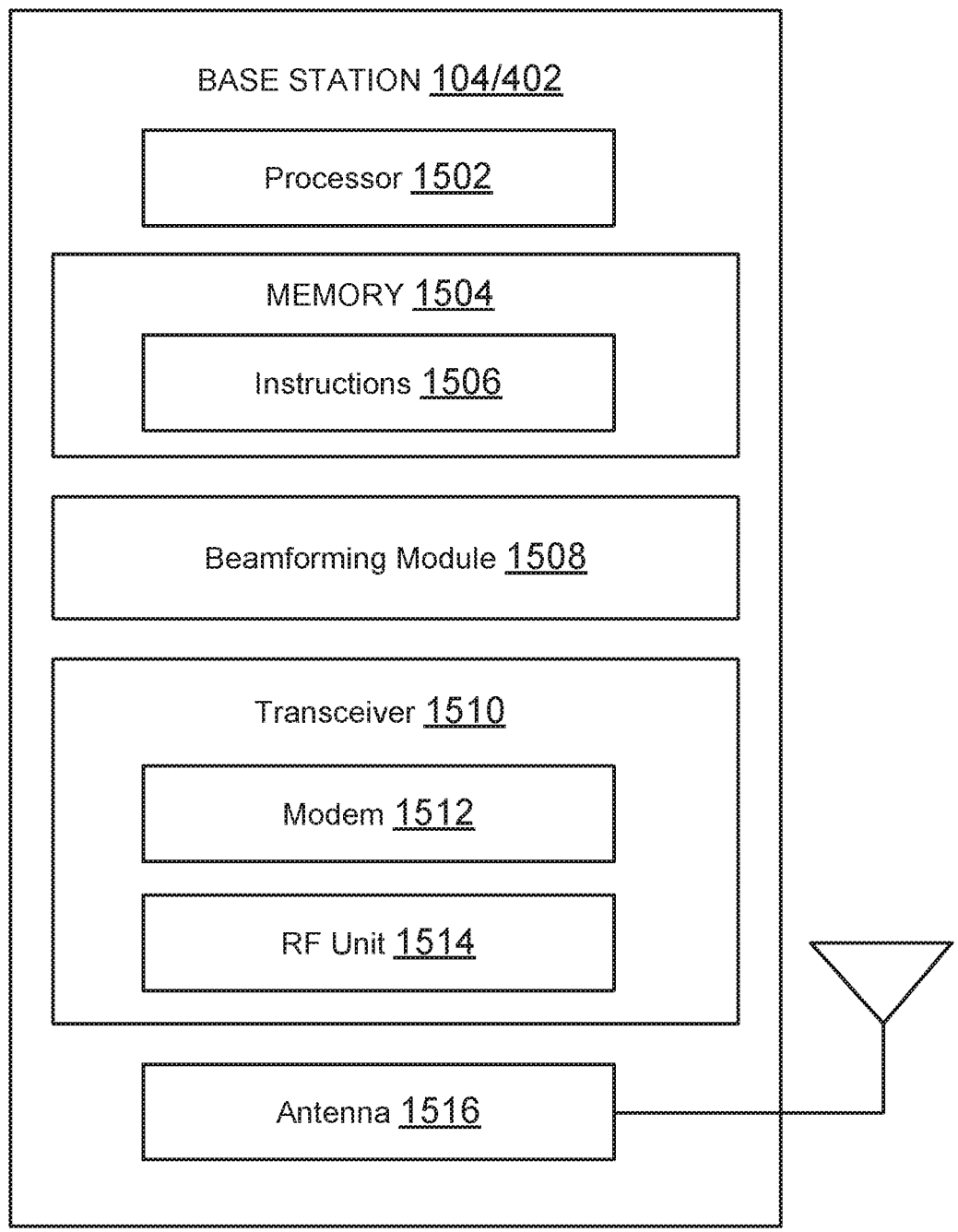
FIG. 15 is a block diagram of an exemplary wireless communication device, such as a base station, according to embodiments of the present disclosure.

FIG. 15 illustrates a block diagram of an exemplary base station 104 according to the present disclosure. The base station 104 may include a processor 1502, a memory 1504, a beamforming module 1508, a transceiver 1510 (including a modem 1512 and RF unit 1514), and an antenna 1516. These elements may be in direct or indirect communication with each other, for example via one or more buses.

The processor 1502 may have various features as a specific-type processor. For example, these may include a CPU, a DSP, an ASIC, a controller, a FPGA device, another hardware device, a firmware device, or any combination thereof configured to perform the operations described herein with reference to the base stations 104 introduced in FIG. 1 above. The processor 1502 may also be implemented as a combination of computing devices, e.g., a combination of a DSP and a microprocessor, a plurality of microprocessors, one or more microprocessors in conjunction with a DSP core, or any other such configuration.

The memory 1504 may include a cache memory (e.g., a cache memory of the processor 1502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1504 may include a non-transitory computer-readable medium. The memory 1504 may store instructions 1506. The instructions 1506 may include instructions that, when executed by the processor 1502, cause the processor 1502 to perform operations described herein with reference to a base station 104 in connection with embodiments of the present disclosure. Instructions 1506 may also be referred to as code, which may be interpreted broadly to include any type of computer-readable statement(s) as discussed above with respect to FIG. 2.

The beamforming module 1508 may be used for various aspects of the present disclosure. For example, the beamforming module 1508 may extract information from an SRS received from a UE 102 and train beamforming at each antenna 1516 based on the extracted information.

As shown, the transceiver 1510 may include the modem subsystem 1512 and the radio frequency (RF) unit 1514. The transceiver 1510 can be configured to communicate bi-directionally with other devices, such as UE 102 and/or another core network element. The modem subsystem 1512 may be configured to modulate and/or encode data according to a MCS, e.g., a LDPC coding scheme, a turbo coding scheme, a convolutional coding scheme, etc. The RF unit 1514 may be configured to process (e.g., perform analog to digital conversion or digital to analog conversion, etc.) modulated/encoded data from the modem subsystem 1512 (on outbound transmissions) or of transmissions originating from another source such as a UE 102. Although shown as integrated together in transceiver 1510, the modem subsystem 1512 and the RF unit 1514 may be separate devices that are coupled together at the base station 104 to enable the base station 104 to communicate with other devices.

The RF unit 1514 may provide the modulated and/or processed data, e.g. data packets (or, more generally, data messages that may contain one or more data packets and other information), to the antenna 1516 for transmission to one or more other devices. This may include, for example, transmission of information to complete attachment to a network and communication with a camped UE 102 according to embodiments of the present disclosure. The antenna 1516 may further receive data messages transmitted from other devices and provide the received data messages for processing and/or demodulation at the transceiver 1510. Although FIG. 15 illustrates antenna 1516 as a single antenna, antenna 1516 may include multiple antennas of similar or different designs in order to sustain multiple transmission links.

Further embodiments of the present disclosure include a method for receiving a signal from a wireless communication device at a first base station, the received signal based on a spatial direction of an interfering signal received by the wireless communication device from a second base station, and transmitting from the first base station a downlink communication to the wireless communication device, wherein downlink communication layers are beamformed in a spatial direction based on the signal received from the wireless communication device.

In some embodiments the received signal may be a beamformed SRS. The beamformed SRS may have a spatial direction that limits interference at the wireless communication device from the interfering signal. The first base station may further establish a communication channel between itself and the wireless communication device based on the beamformed SRS. The base station may have a plurality of antennas operable to transmit along different spatial directions, and the downlink communication from the base station to the wireless communication device may be transmitted using at least one antenna of the first base station operable to transmit along the spatial direction determined based on the signal received from the wireless communication device. Transmitting the downlink communication from the base station to the wireless communication device may include transmitting the downlink communication along a path selected from among a plurality of paths based on the signal received from the wireless communication device. The downlink communication may be established based on a beam codebook or based on a reciprocal beam calculation.

Further embodiments of the present disclosure include a base station comprising a transceiver operable to receive, from a wireless communication device, a signal based on a spatial direction of an interfering signal received by the wireless communication device from a second base station, and to transmit to the wireless communication device a downlink communication which has layers that are beamformed in a spatial direction based on the signal received from the wireless communication device. The signal received from the wireless communication device may be a beamformed SRS, which may have a spatial direction that limits interference at the wireless communication device from the interfering signal. The base station may further comprise a computing device in communication with the transceiver which is operable to establish a communication channel with the wireless communication device based on the beamformed SRS.

The base station may further comprise a plurality of antennas in communication with the transceiver that are operable to transmit along different spatial directions. The downlink communication may be transmitted using at least one antenna operable to transmit along the spatial direction based on the signal received from the wireless communication device. The base station may transmit the downlink communication along a path selected from among a plurality of paths based on the signal received from the wireless communications device. The base station may further comprise a computing device operable to establish the downlink communication based on a beam codebook, or based on a reciprocal beam calculation.

Further embodiments of the present disclosure include a base station comprising means for receiving from a wireless device a signal based on a spatial direction of an interfering signal received by the wireless communication device from a second base station and means for transmitting to the wireless communication device a downlink communication whose layers are beamformed in a spatial direction based on the signal received from the wireless communication device.

The signal received from the wireless communication device may be a beamformed SRS, which may have a spatial direction that limits interference at the wireless communication device from the interfering signal. The base station may further comprise means for establishing a communication channel with the wireless communication device based on the beamformed SRS.

The base station may further comprise means for transmitting along different spatial directions, and the downlink communication may be transmitted along a spatial direction based on the signal received from the wireless communication device. The base station may further comprise means for transmitting the downlink communication along a path selected from among a plurality of paths based on the signal received from the wireless communication device. The base station may further comprise means for establishing the downlink communication based on a beam codebook or based on a reciprocal beam calculation.

Further embodiments of the present disclosure include a wireless communication device in communication with a first base station, comprising means for receiving an interfering signal from a second base station, means for determining a spatial direction of the interfering signal, and means for transmitting a signal to the first base station based on the spatial direction of the interfering signal. This signal may be a beamformed SRS, which may have a spatial direction that limits interference from the interfering signal. The wireless communication device may further include means for establishing the beamformed SRS based on a beam codebook or based on a calculation associated with interference from the interfering signal.

The wireless communication device may further comprise means for receiving a downlink communication from the first base station, the downlink communication layers being beamformed in a spatial direction based on the signal transmitted to the first base station. The wireless communication device may further comprise means for transmitting multiple signals to the first base station based on the spatial direction of the interfering signal. The means for transmitting multiple signals may include means for transmitting the multiple signals simultaneously or sequentially over time. The multiple signals may each have a different phase. The wireless communication device may further include means for transmitting at least one SRS at a first time and means for transmitting at least one SRS at a second time.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, the method comprising:
   receiving, by a first base station from a wireless communication device, a first signal during a first time period, the first signal based on a spatial direction of an interfering signal received by the wireless communication device from a second base station, and the first time period configured for a transmission from a first antenna of the wireless communication device;
   receiving, by the first base station from the wireless communication device, a second signal during a second time period after the first time period, the second signal based on the spatial direction of the interfering signal, and the second time period configured for a transmission from a second antenna of the wireless communication device; and
   transmitting, by the first base station to the wireless communication device, a downlink communication beamformed in a downlink spatial direction based on the first signal and the second signal received from the wireless communication device.

2. The method of claim 1, wherein the receiving the first signal includes:
   receiving a beamformed sounding reference signal (SRS).

3. The method of claim 2, wherein the beamformed SRS has a spatial direction that limits interference at the wireless communication device from the interfering signal.

4. The method of claim 2, further comprising:
   establishing, by the first base station, a communication channel between the first base station and wireless communication device based on the beamformed SRS.

5. The method of claim 1, wherein the first time period and the second time period are sequential time periods.

6. The method of claim 1, wherein the first signal and the second signal each have a different phase.

7. The method of claim 1, wherein the transmitting the downlink communication includes:
   transmitting the downlink communication using at least one antenna of a plurality of antennas of the first base station, the plurality of antennas operable to transmit along different spatial directions including the beamformed downlink spatial direction.

8. The method of claim 1, further comprising:
   establishing, by the first base station, the downlink communication based on at least one of a beam codebook or a reciprocal beam calculation.

9. A base station comprising:
   a transceiver configured to:
      receive a first signal from a wireless communication device during a first time period, the first signal based on a spatial direction of an interfering signal received by the wireless communication device from a second base station, and the first time period configured for a transmission from a first antenna of the wireless communication device;
      receive a second signal from the wireless communication device during a second time period after the first time period, the second signal based on the spatial direction of the interfering signal, and the second time period configured for a transmission from a second antenna of the wireless communication device; and
      transmit a downlink communication to the wireless communication device, the downlink communication beamformed in a downlink spatial direction based on the first signal and the second signal received from the wireless communication device.

10. The base station of claim 9, wherein the transceiver is further configured to receive the first signal from the wireless communication device by:
    receiving a beamformed sounding reference signal (SRS).

11. The base station of claim 10, wherein the beamformed SRS has a spatial direction that limits interference at the wireless communication device from the interfering signal.

12. The base station of claim 10, further comprising:
    a processor configured to establish a communication channel with the wireless communication device based on the beamformed SRS.

13. The base station of claim 9, wherein the first time period and the second time period are sequential time periods.

14. The base station of claim 9, wherein the first signal and the second signal each have a different phase.

15. The base station of claim 9, further comprising:
    a plurality of antennas configured to transmit along different spatial directions including the beamformed downlink spatial direction,
    wherein the downlink communication is transmitted using at least one antenna of the plurality of antennas.

16. The base station of claim 9, further comprising:
    a processor configured to establish the downlink communication based on at least one of a beam codebook or a reciprocal beam calculation.

17. A non-transitory computer-readable medium having program code recorded thereon, the program code comprising:
    code for causing a first base station to receive, from a wireless communication device, a first signal during a first time period, the first signal based on a spatial direction of an interfering signal received by the wireless communication device from a second base station, and the first time period configured for a transmission from a first antenna of the wireless communication device;
    code for causing the first base station to receive, from the wireless communication device, a second signal during a second time period after the first time period, the second signal based on the spatial direction of the interfering signal, and the second time period configured for a transmission from a second antenna of the wireless communication device; and
    code for causing the first base station to transmit, to the wireless communication device, a downlink communication beamformed in a downlink spatial direction based on the first signal and the second signal received from the wireless communication device.

18. The non-transitory computer-readable medium of claim 17, wherein the code for causing the first base station to receive the first signal is further configured to:
    receive a beamformed sounding reference signal (SRS).

19. The non-transitory computer-readable medium of claim 18, wherein the beamformed SRS has a spatial direction that limits interference at the wireless communication device from the interfering signal.

20. The non-transitory computer-readable medium of claim 18, further comprising:
    code for causing the first base station to establish a communication channel between the first base station and wireless communication device based on the beamformed SRS.

21. The non-transitory computer-readable medium of claim 17, wherein the first time period and the second time period are sequential time periods.

22. The non-transitory computer-readable medium of claim 17, wherein the first signal and the second signal each have a different phase.

23. The non-transitory computer-readable medium of claim 17, wherein the code for causing the first base station to transmit the downlink communication is further configured to:
    transmit the downlink communication using at least one antenna of a plurality of antennas of the first base station, the plurality of antennas operable to transmit along different spatial directions including the beamformed downlink spatial direction.

24. The non-transitory computer-readable medium of claim 17, further comprising:
    code for causing the first base station to establish the downlink communication based on at least one of a beam codebook or a reciprocal beam calculation.

25. A base station comprising:
    means for receiving, from a wireless communication device, a first signal during a first time period, the first signal based on a spatial direction of an interfering signal received by the wireless communication device from a second base station, and the first time period configured for a transmission from a first antenna of the wireless communication device;
    means for receiving, from the wireless communication device, a second signal during a second time period after the first time period, the second signal based on the spatial direction of the interfering signal, and the second time period configured for a transmission from a second antenna of the wireless communication device; and
    means for transmitting, to the wireless communication device, a downlink communication beamformed in a downlink spatial direction based on the first signal and the second signal received from the wireless communication device.

26. The base station of claim 25, wherein the means for receiving the first signal is further configured to:
    receive a beamformed sounding reference signal (SRS).

27. The base station of claim 26, wherein the beamformed SRS has a spatial direction that limits interference at the wireless communication device from the interfering signal.

28. The base station of claim 26, further comprising:
    means for establishing a communication channel between the base station and wireless communication device based on the beamformed SRS.

29. The base station of claim 25, wherein the means for transmitting the downlink communication is further configured to:
    transmit the downlink communication using at least one antenna of a plurality of antennas of the base station, the plurality of antennas operable to transmit along different spatial directions including the beamformed downlink spatial direction.

30. The base station of claim 25, further comprising:
    means for establishing the downlink communication based on at least one of a beam codebook or a reciprocal beam calculation.

* * * * *